US009888345B2

(12) United States Patent
Brachet et al.

(10) Patent No.: US 9,888,345 B2
(45) Date of Patent: *Feb. 6, 2018

(54) TECHNIQUES FOR CACHING WI-FI ACCESS POINT DATA ON A MOBILE CLIENT DEVICE USING TILES

(71) Applicant: Skyhook Wireless, Inc., Boston, MA (US)

(72) Inventors: Nicholas Brachet, Newton, MA (US); Farshid Alizadeh-Shabdiz, Wayland, MA (US); Joel N. Nelson, Groton, MA (US); Russel K. Jones, Medfield, MA (US)

(73) Assignee: Shyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,960

(22) Filed: Jul. 11, 2016

(65) Prior Publication Data
US 2016/0323704 A1 Nov. 3, 2016

Related U.S. Application Data

(63) Continuation of application No. 14/627,660, filed on Feb. 20, 2015, now Pat. No. 9,392,407, which is a (Continued)

(51) Int. Cl.
*H04W 24/00* (2009.01)
*H04W 4/02* (2009.01)
(Continued)

(52) U.S. Cl.
CPC .......... *H04W 4/021* (2013.01); *G01S 5/0236* (2013.01); *G01S 5/0242* (2013.01);
(Continued)

(58) Field of Classification Search
CPC . H04W 16/32; H04W 36/0083; H04W 48/20; H04W 24/10; H04W 88/08;
(Continued)

(56) References Cited

U.S. PATENT DOCUMENTS 7,277,054 B2    10/2007  Alanen et al.
8,983,493 B2 *   3/2015  Brachet .................. G01S 5/0236
                                                                340/572.4
(Continued)

*Primary Examiner* — Nimesh Patel
(74) *Attorney, Agent, or Firm* — Cesari and McKenna, LLP; James A. Blanchette

(57) ABSTRACT

In one embodiment, Wi-Fi access point data is cached on a mobile client device in response to distances to WPS tile boundaries. The mobile client device identifies one or more Wi-Fi access points in range based on signals received by a Wi-Fi radio, and estimates its location utilizing the identified one or more Wi-Fi access points and Wi-Fi access point data of one or more Wi-Fi positioning system (WPS) tiles in a WPS tile store on the mobile client device. Based on the estimated location, the mobile client device determines it is within a threshold distance of a boundary of the one or more WPS tiles present in the WPS tile store and requests one or more new WPS tiles from a reference database of a remote server. Upon receipt, the one or more new WPS tiles are cached in the WPS tile store on the mobile client device.

19 Claims, 22 Drawing Sheets

Related U.S. Application Data continuation of application No. 13/758,154, filed on Feb. 4, 2013, now Pat. No. 8,983,493, which is a continuation of application No. 11/966,673, filed on Dec. 28, 2007, now Pat. No. 8,369,264, which is a continuation-in-part of application No. 11/261,898, filed on Oct. 28, 2005, now Pat. No. 7,414,988.

(60) Provisional application No. 60/623,108, filed on Oct. 29, 2004.

(51) Int. Cl.
<table>
<tr><td><i>G01S 5/02</i></td><td>(2010.01)</td></tr>
<tr><td><i>H04W 48/20</i></td><td>(2009.01)</td></tr>
<tr><td><i>H04L 29/08</i></td><td>(2006.01)</td></tr>
<tr><td><i>H04W 8/00</i></td><td>(2009.01)</td></tr>
<tr><td><i>H04W 16/18</i></td><td>(2009.01)</td></tr>
<tr><td><i>H04W 48/08</i></td><td>(2009.01)</td></tr>
<tr><td><i>H04W 48/14</i></td><td>(2009.01)</td></tr>
<tr><td><i>H04W 64/00</i></td><td>(2009.01)</td></tr>
<tr><td><i>H04W 84/12</i></td><td>(2009.01)</td></tr>
</table>

(52) U.S. Cl.
CPC ........... *H04L 67/2857* (2013.01); *H04W 4/02* (2013.01); *H04W 4/027* (2013.01); *H04W 4/028* (2013.01); *H04W 8/005* (2013.01); *H04W 48/20* (2013.01); *H04W 16/18* (2013.01); *H04W 48/08* (2013.01); *H04W 48/14* (2013.01); *H04W 64/00* (2013.01); *H04W 84/12* (2013.01)

(58) Field of Classification Search
CPC . H04W 36/00; H04W 36/0055; H04W 36/32; H04W 48/18; H04W 84/045; H04W 36/0005; H04W 48/10; H04W 52/40; H04W 16/16; H04W 16/18
See application file for complete search history.

(56) References Cited

U.S. PATENT DOCUMENTS

| | | | |
|---|---|---|---|
| 9,392,407 B2* | 7/2016 | Brachet | G01S 5/0236 |
| 2005/0037775 A1* | 2/2005 | Moeglein | G01S 5/0036 |
| | | | 455/456.1 |
| 2006/0046709 A1* | 3/2006 | Krumm | H04N 21/4126 |
| | | | 455/422.1 |
| 2009/0286504 A1* | 11/2009 | Krasner | G08B 25/009 |
| | | | 455/404.1 |

* cited by examiner

Figure 9: Positioning Software

Figure 10: Scanning Client

Figure 11: comparison of scanning models

TECHNIQUES FOR CACHING WI-FI ACCESS POINT DATA ON A MOBILE CLIENT DEVICE USING TILES

CROSS-REFERENCE TO RELATED APPLICATIONS

This application is a continuation of and claims priority under 35 U.S.C. § 120 to U.S. patent application Ser. No. 14/627,660 (U.S. Pat. No. 9,392,407), filed on Feb. 20, 2015, entitled "Method and System for Selecting and Providing a Relevant Subset of Wi-Fi Location Information to a Mobile Client Device So the Client Device May Estimate its Position with Efficient Utilization of Resources", which a continuation of U.S. patent application Ser. No. 13/758,154 (U.S. Pat. No. 8,983,493), filed on Feb. 4, 2013, entitled "Method and System for Selecting and Providing a Relevant Subset of Wi-Fi Location Information to a Mobile Client Device So the Client Device May Estimate its Position with Efficient Utilization of Resources", which a continuation of U.S. patent application Ser. No. 11/966,673 (U.S. Pat. No. 8,369,264), filed on Dec. 28, 2007, entitled "Method and System for Selecting and Providing a Relevant Subset of Wi-Fi Location Information to a Mobile Client Device So the Client Device May Estimate its Position with Efficient Utilization of Resources," which is a continuation-in-part of U.S. patent application Ser. No. 11/261,898 (U.S. Pat. No. 7,414,988), filed on Oct. 28, 2005, entitled "Server for Updating Location Beacon Database," which claims priority from U.S. Provisional Patent Application No. 60/623,108, filed on Oct. 29, 2004, entitled "Wireless data scanning network for building location beacon database," which are incorporated herein by reference in their entirety.

BACKGROUND

Field of the Invention

The invention generally relates to methods and systems for determining the location of a Wi-Fi-enabled device, and, more specifically, to methods and systems for efficiently managing and distributing Wi-Fi location data to a mobile client device so the client can use such information to estimate its position.

Discussion of Related Art

In recent years the number of mobile computing devices has increased dramatically, creating the need for more advanced mobile and wireless services. Mobile email, walkie-talkie services, multi-player gaming and call-following are examples of how new applications are emerging on mobile devices. In addition, users are beginning to demand and seek out applications that not only utilize their current location but also share that location information with others. Parents wish to keep track of their children, supervisors need to track the location of the company's delivery vehicles, and a business traveler looks to find the nearest pharmacy to pick up a prescription. All of these examples require an individual to know his own current location or that of someone else. To date, we all rely on asking for directions, calling people to ask their whereabouts, or having workers check-in from time to time with their position.

Location-based services represent an emerging class of mobile applications that leverage the ability of devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept: using radio signals coming from known reference points, these devices can mathematically calculate the user's position relative to these reference points. Each of these technologies has strengths and weaknesses according to the specific radio technologies and positioning algorithms it employs.

The Global Positioning System (GPS) operated by the US Government leverages dozens of orbiting satellites as reference points. These satellites broadcast radio signals that are picked up by GPS receivers. The receivers measure the time it took for a received signal to travel to the receiver. After receiving signals from three or more GPS satellites the receiver can triangulate its position on the globe. For the system to work effectively, the radio signals must reach the receiver with little or no interference. Weather, buildings or structures, and foliage can interfere with this process because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers (see, e.g., Muthukrishnan, K. et al., *Towards Smart Surroundings: Enabling Techniques and Technologies for Localization*, from *Location-and Context-Awareness*, Springer Berlin, Heidelberg, May 2005). The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

Microsoft Corporation and Intel Corporation (through a research group known as PlaceLab) have deployed a Wi-Fi location system using a database of access point locations acquired from amateur scanners (known as "wardrivers") who submit their Wi-Fi scan data to public community web sites (see, e.g., LaMarca, A. et al., *Place Lab: Device Positioning Using Radio Beacons in the Wild*, in *Proceedings of the Third International Conference an Pervasive Computing*, May 2005). Examples include WiGLE, Wi-FiMaps.com, Netstumbler.com and NodeDB. Both Microsoft and Intel have developed their own client software that uses the Wi-Fi information submitted by wardrivers as a reference in estimating the location of a client device.

Because individuals voluntarily supply the data, these systems suffer from a number of performance and reliability problems. First, the data across the databases are not contemporaneous; some of the data are new while other portions are 3-4 years old. The age of Wi-Fi location data is important, since over time access points can be moved or taken offline. Second, the data are acquired using a variety of hardware and software configurations. Every 802.11 radio and antenna has different signal reception characteristics affecting the representation of the strength of the signal. Each scanning software implementation scans for Wi-Fi signals in different ways during different time intervals. As a result, the access point information in the database lacks a common standard of reference. Third, the user-supplied data suffer from arterial bias. Because the data is self-reported by individuals who are not following designed scanning routes, the data tends to aggregate around heavily trafficked areas. Arterial bias causes location estimates to be "pulled" towards main arteries, resulting in substantial accuracy errors. Fourth, these databases include the calculated position of scanned access points rather than the raw scanning data obtained by the 802.11 hardware. Each of these databases calculates the access point location differently and each with a rudimentary weighted average formula. The result is that the location estimates for some access points in the database are highly inaccurate.

There have been a number of commercial offerings of Wi-Fi location systems targeted at indoor positioning (see, e.g., Muthukrishnan, K., et al., *Towards Smart Surroundings: Enabling Techniques and Technologies for Localization, Lecture Notes in Computer Science*, Vol. 3479, pp. 350-362, January 2005; Hazas, M., et al., *Location-Aware Computing Comes of Age, IEEE Computer*, Vol. 37(2), pp. 95-97, February 2004, both of which are incorporated by reference herein). These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario.

There are numerous 802.11 location scanning clients available that record the presence of 802.11 signals and associate this information with a GPS location reading. These software applications are operated manually and produce a log file of the readings. Examples of such applications are Netstumber, Kismet and Wi-FiFoFum. Some hobbyists use these applications to mark the locations of 802.11 access point signals they detect and share them with each other. The management of this data and the sharing of the information is performed on an ad hoc basis. These applications do not perform any calculation as to the physical location of the access point; they merely record the location from which the access point was detected.

Using data gathered by any of these systems requires access to either the raw data that were gathered or the calculated locations for each of the access points. Devices that require the use of these data must somehow gain access to the data. This access is generally accomplished in one of two ways: (i) by means of a network request-response interaction between the mobile device and a networked server; or (ii) by storing a Wi-Fi access point database on the mobile device itself.

Software that operates on mobile devices is often constrained by the limited physical capabilities of such devices and the cost of mobile resources and services. These constraints include both hardware (memory capacity, power storage and consumption, CPU speed, network capacity and availability) as well as cost constraints for network access and bandwidth consumption. These limitations place a burden on any solution that intends to make use of the available resources, and in particular, create an optimization problem for efficiently managing and distributing Wi-Fi location data.

This optimization problem is compounded by the fact that the Wi-Fi location database itself requires frequent updates. This is a result of the transient nature of Wi-Fi access points, which are often moved or decommissioned. Thus, the database must be updated regularly to ensure that it contains relatively current Wi-Fi location information.

SUMMARY OF THE INVENTION

The invention provides methods and systems for selecting and providing a relevant subset of Wi-Fi location information to a mobile client device so the client device may estimate its position with efficient utilization of resources.

Under one aspect of the invention, a method of selecting and providing a relevant subset of Wi-Fi location information includes scanning for Wi-Fi access points within range of a client device, using a Wi-Fi database that covers a large target region to retrieve information about these access points, using this information to estimate the position of the mobile client device, selecting a limited region in the vicinity of the estimated location of the client device, and providing information about Wi-Fi access points within this limited region to the client.

Under another aspect of the invention, the target region of the database is partitioned into a set of fixed geographical partitions according to a prearranged scheme, and the limited region is comprised of one or more of these partitions.

Under another aspect of the invention, the target region of the database is partitioned into a set of geometrically similar, polygonal tiles.

Under another aspect of the invention, the polygonal tiles form a hierarchy in which smaller tiles are nested within larger tiles.

Under another aspect of the invention, a maximum number of Wi-Fi access points that may be contained within a single polygonal tile is selected, and the size of the polygonal tiles is determined according to this maximum.

Under another aspect of the invention, each polygonal tile is associated with a timestamp that reflects the most recent update to the access points within that tile, and this timestamp is used to determine whether the data that is cached on the client device is up-to-date.

Under another aspect of the invention, the estimated speed and direction of the client device is used in determining the limited region.

Under another aspect of the invention, the predicted route of the client device is used in determining the limited region.

Under another aspect of the invention, the amount of available memory on the client device is used in determining the limited region.

Under another aspect of the invention, the speed of the communication between the client device and the database is used in determining the limited region.

Under another aspect of the invention, the client device is initialized with a portion of the Wi-Fi data that corresponds to a specified geographical region, and this data is updated by communicating with the Wi-Fi database.

BRIEF DESCRIPTION OF THE SEVERAL VIEWS OF THE DRAWINGS

For a more complete understanding of various embodiments of the present invention, reference is now made to the following descriptions taken in connection with the accompanying drawings, in which.

DETAILED DESCRIPTION

Introduction

Preferred embodiments of the present invention provide a Wi-Fi positioning system (WPS) used to estimate the geographic location of mobile devices. A WPS includes a database of known access point (AP) locations that are used as reference points in estimating the client's location. Preferred embodiments maintain a cache of Wi-Fi access point data on the client device. Under this approach, the server sends the client a subset of the Wi-Fi access point database containing Wi-Fi access points that are in the general vicinity of the client device. The client stores this information in its local memory cache, where it can be used to satisfy subsequent location requests. If the client device finds that the cache does not contain the information necessary to locate itself or that the data in the cache is out-of-date, or if the client anticipates that more data will be needed in the near future, it supplements the cache by downloading the required data from the access point database. In certain embodiments, this process is streamlined by grouping the access points into "tiles" that correspond to fixed geographical regions.

Figure 1:
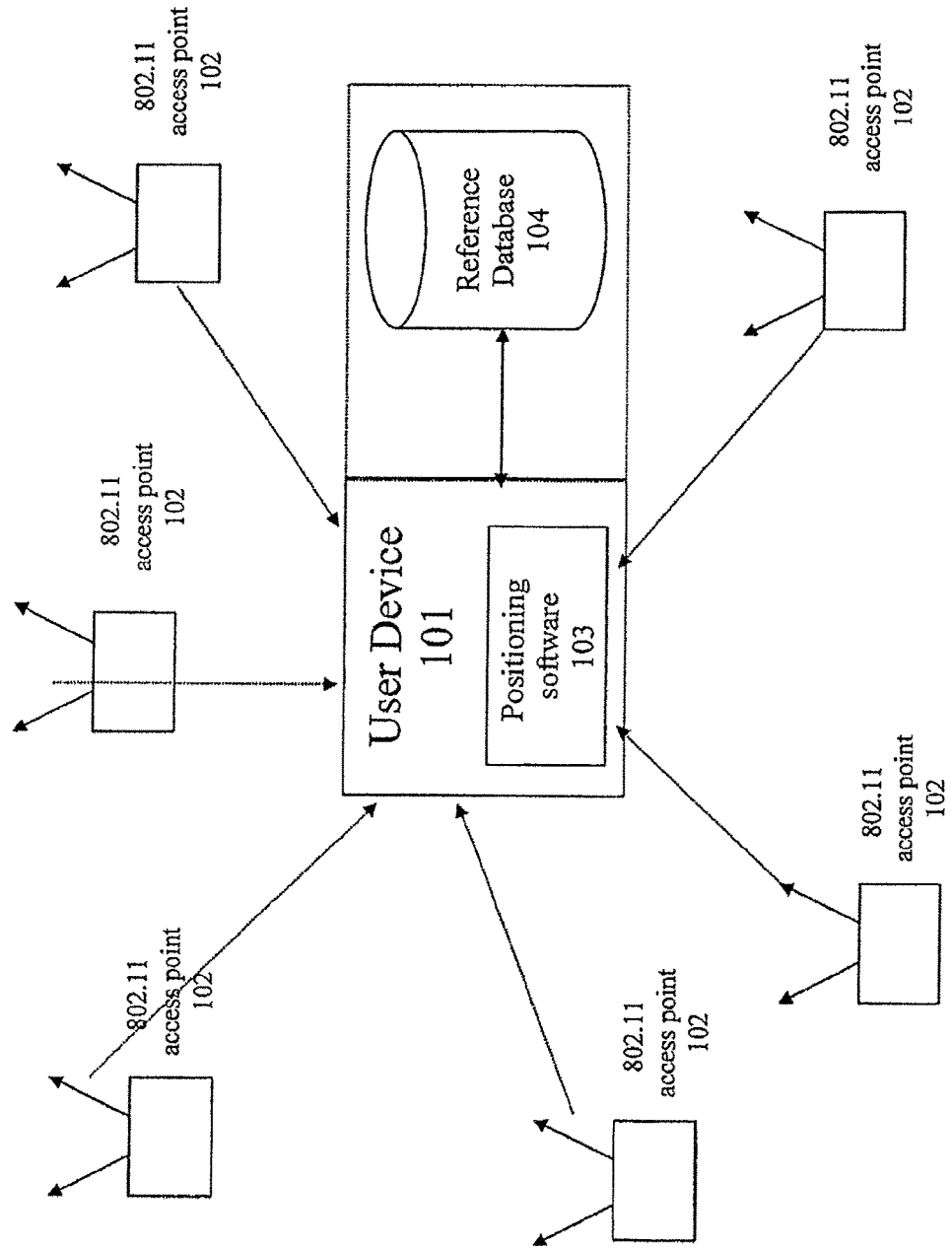
FIG. 1 depicts certain embodiments of a Wi-Fi positioning system.

FIG. 1 depicts a portion of a preferred embodiment of a WPS. The positioning system includes positioning software

[103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations or power profile of all the access points the gathering system has collected. The power profile is a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

Figure 9:
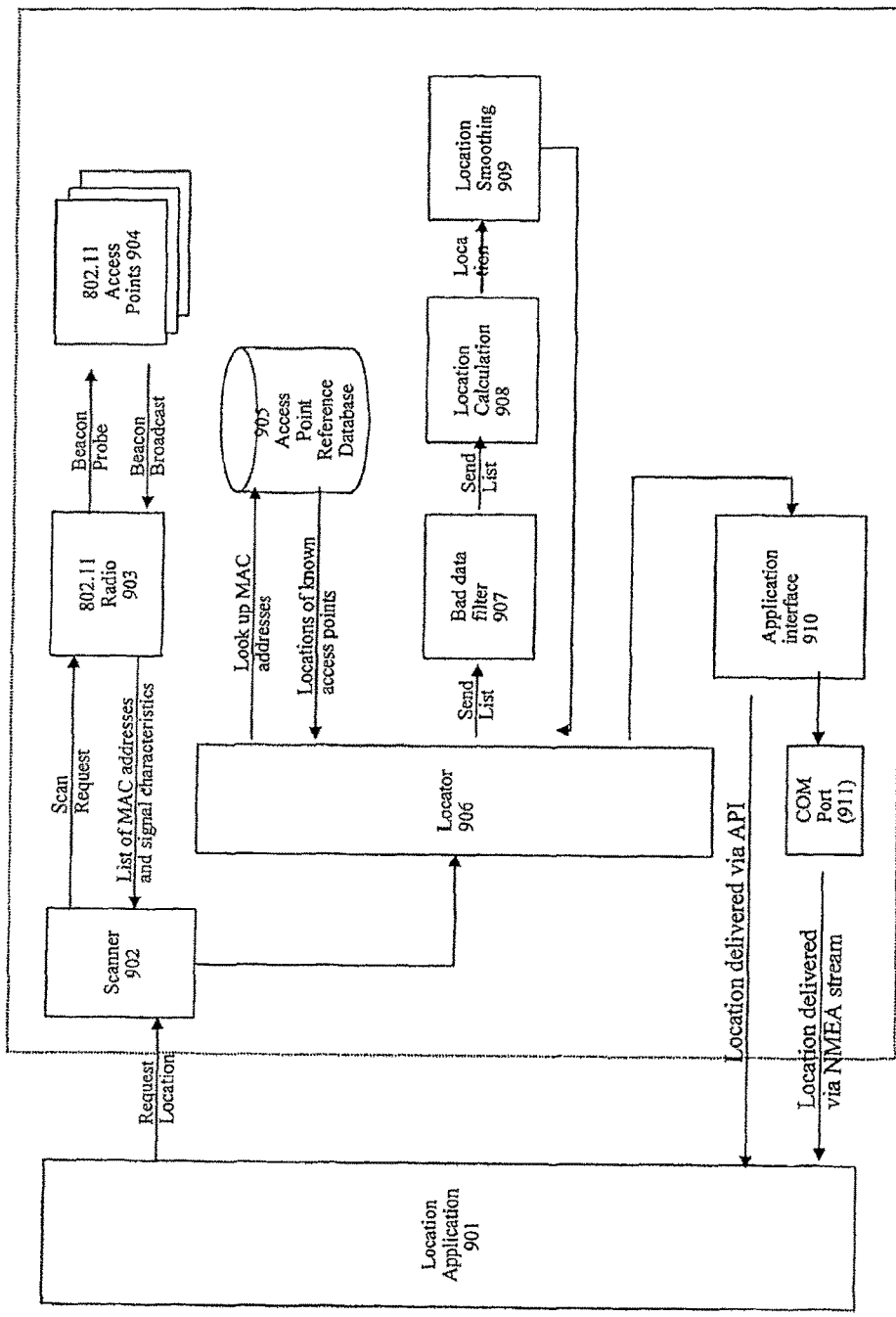
FIG. 9 depicts an exemplary architecture of positioning software according to certain embodiments of the invention.

The positioning software is described in greater detail with reference to FIG. 9, which depict exemplary components of positioning software 103. Typically there is an application or service [901] that utilizes location readings to provide some value to an end user (example, driving directions). This location application makes a request of the positioning software for the location of the device at that particular moment. That request initiates the scanner [902], which makes a "scan request" to the 802.11 radio [903] on the device. The 802.11 radio sends out a probe request to all 802.11 access points [904] within range. According to the 802.11 protocol, those access points in receipt of a probe request will transmit a broadcast beacon containing information about the access point. That beacon includes the MAC address of the device, the network name, the precise version of the protocol that it supports and its security configuration along with information about how to connect to the device. The 802.11 radio collects this information from each access point that responds, calculates the signal strength of each access point and sends that back to the scanner.

The scanner passes this array of access points to the Locator [906] which checks the MAC addresses of each observed access point against the Access Point Reference Database [905]. This database can either be located on the device or remotely over a network connection. The Access Point Reference Database returns the location data for each of the observed access points that are known to the system. The Locator passes this collection of location information along with the signal characteristics returned from each access point to the Bad Data Filter [907]. This filter applies a number of comparison tests against each access point to determine if any of the access points have moved since they were added to the access point database. After removing bad data records, the Filter sends the remaining access points to the Location Calculation component [908]. Using the reference data from the access point database and the signal strength readings from the Scanner, the Location Calculation component computes the location of the device at that moment. Before that location data is sent back to the Locator, it is processed by the Smoothing engine [909] which averages a past series of location readings to remove any erratic readings from the previous calculation. The adjusted location data is then sent back to the Locator.

The calculated location readings produced by the Locator are communicated to these location-based applications [901] through the Application Interface [910] which includes an application programming interface (API) or via a virtual GPS capability [911]. GPS receivers communicate their location readings using proprietary messages or using the location standard like the one developed by the National Marine Electronics Association (NMEA). Connecting into the device using a standard interface such as a COM port on the machine retrieves the messages. Certain embodiments of the invention include a virtual GPS capability that allows any GPS compatible application to communicate with this new positioning system without have to alter the communication model or messages.

The location calculations are produced using a series of positioning algorithms intended to turn noisy data flows into reliable and steady location readings. The client software compares the list of observed access points along with their calculated signal strengths to weight the location of user to determine precise location of the device user. A variety of techniques are employed including simple signal strength weighted average models, nearest neighbor models combined with triangulation techniques and adaptive smoothing based on device velocity. Different algorithms perform better under different scenarios and tend to be used together in hybrid deployments to product the most accurate final readings. Preferred embodiments of the invention can use a number of positioning algorithms. The decision of which algorithm to use is driven by the number of access points observed and the user case application using it. The filtering models differ from traditional positioning systems since traditional systems rely on known reference points that never move. In the model of preferred embodiments, this assumption of fixed locations of access points is not made; the access points are not owned by the positioning system so they may move or be taken offline. The filtering techniques assume that some access points may no longer be located in the same place and could cause a bad location calculation. So the filtering algorithms attempt to isolate the access points that have moved since their position was recorded. The filters are dynamic and change based on the number of access points observed at that moment. The smoothing algorithms include simple position averaging as well as advanced Bayesian logic including Kaiman filters. The velocity algorithms calculate device speed by estimating the Doppler effect from the signal strength observations of each access point.

Gathering of Scan Data to Build Reference Database

Figure 2:
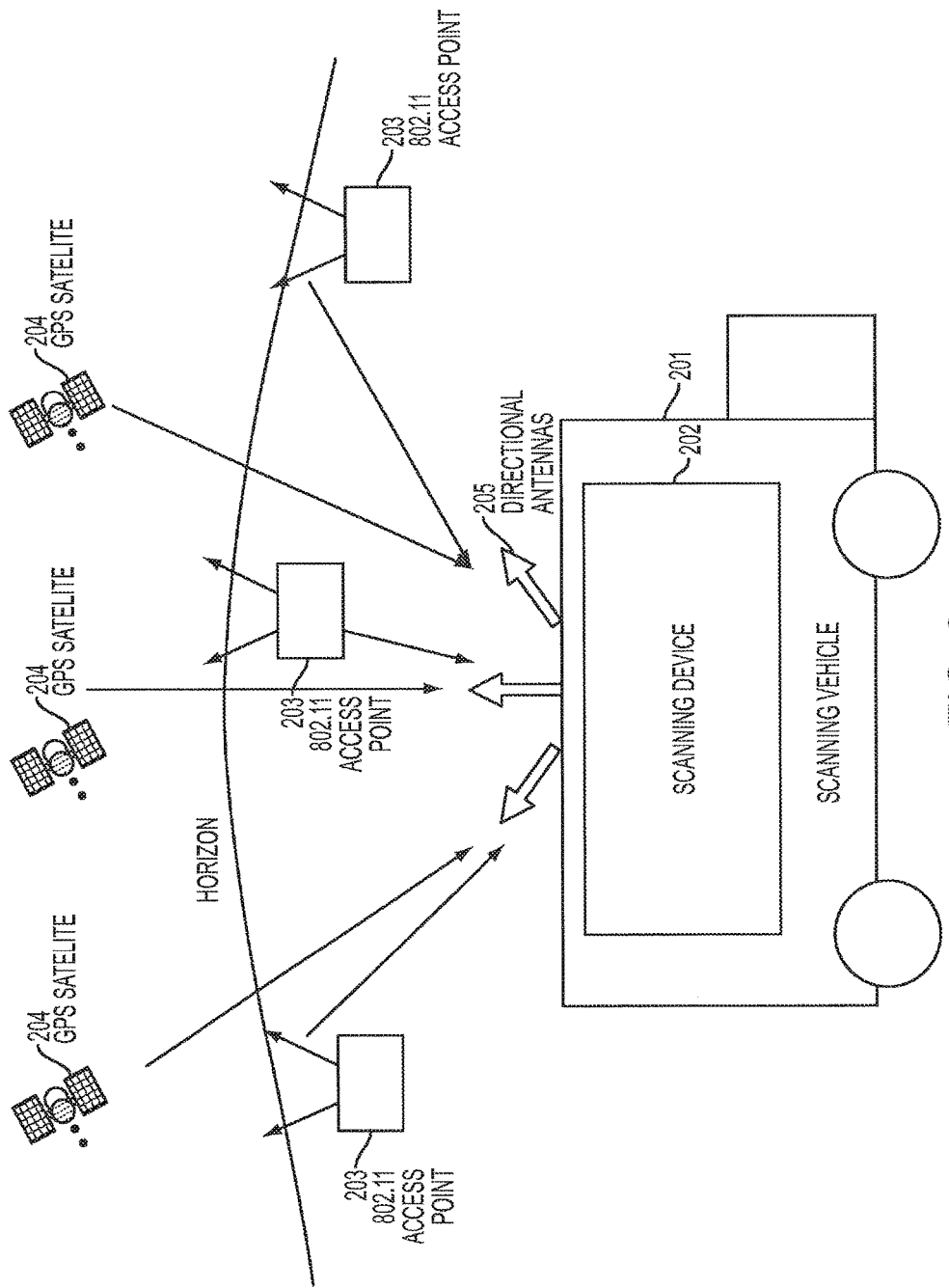
FIG. 2 depicts scanning vehicles including scanning devices according to certain embodiments of the invention.
Figure 3:
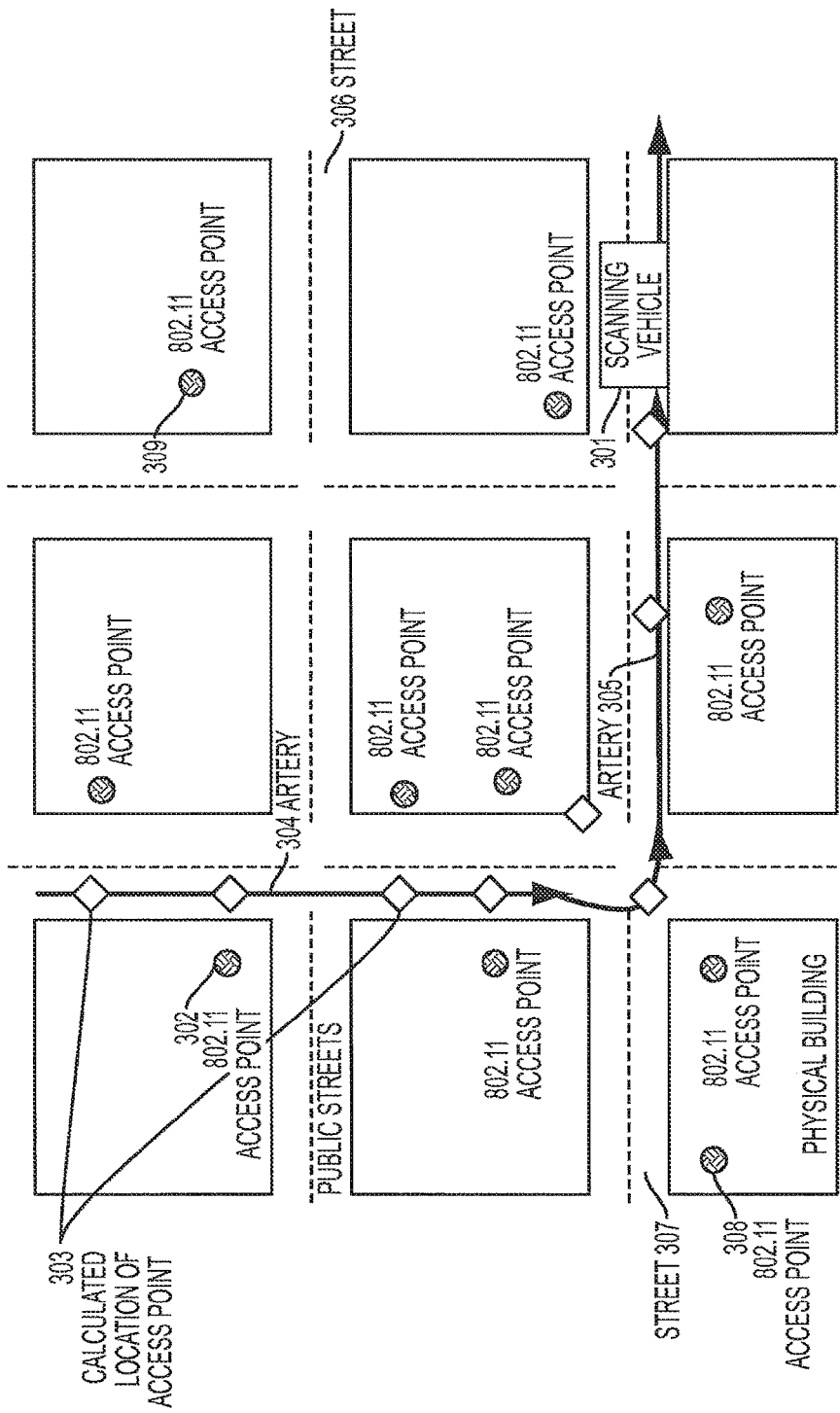
FIG. 3 depicts an example of a scanning scenario to illustrate the problem of arterial bias in data collection.
Figure 11:
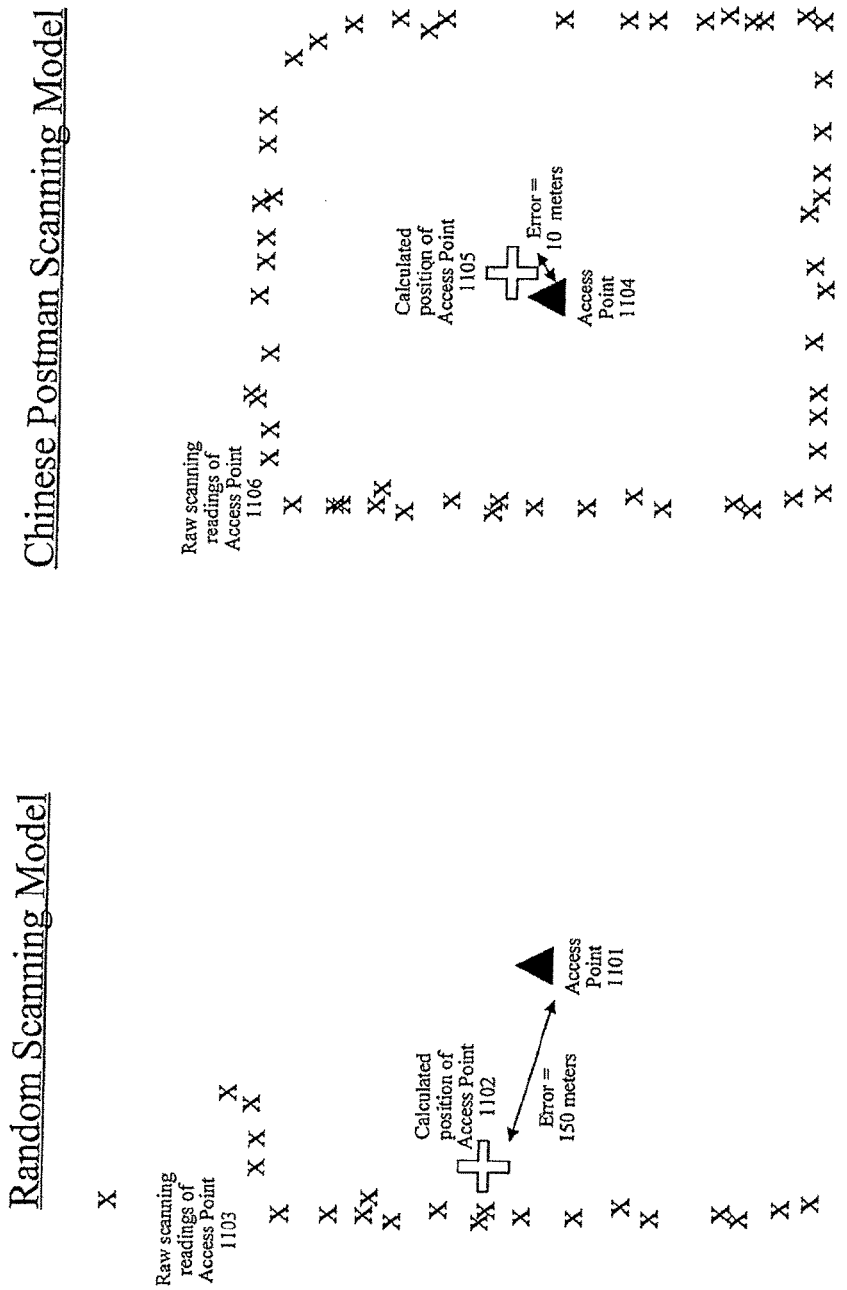
FIG. 11 compares and contrasts the effects of a random scanning model with one using a model from the Chinese postman routing algorithm.

FIG. 2 depicts the components used to gather location information for the various access points. A large fleet of vehicles [201] is deployed to build the reference database (104 of FIG. 1) for the positioning system. These vehicles 201 follow a programmatic route through target scan areas to gather data in the most optimal fashion producing the highest quality data. The target scan areas typically represent a large metropolitan area including every single drivable street in 15-20 mile radius. These vehicles are equipped with scanning devices [202] designed to record the locations and characteristics of 802.11 signals while traversing the coverage area. The scanning devices track the location of the scanning vehicle every second using signal from GPS satellites [204]. The scanning device also tracks the presence of any 802.11 access point within range and records the radio characteristics of that access point signal along with the GPS location of the scanning vehicle. The quality of the data collected is greatly affected by the scanning methodology employed by the scanning vehicles. Each model has its own benefits and limitations. One approach, known as the Random Model, places scanning devices in vehicles as they are conducting daily activities for business or personal use. These vehicles could be delivery trucks, taxi cabs, traveling salesman or just hobbyists. The concept is that over time these vehicles will cover enough streets in their own random fashion in order to build a reliable reference database. The model does in fact provide a simple means to collect data but the quality of the resulting data is negatively affected due to issues of "arterial bias". FIG. 3 describes the challenge of the random model. When scanning vehicles traverse routes designed to solve other problems than gathering data (e.g. delivering packages, people commuting to and from work) they tend to follow destination routes. A destination route is when a driver needs to get from A to B and seeks the fastest route to get there. So the driver looks for the shortest route to the nearest main artery whether it be a highway or a main thoroughfare. As a result, over time the random driving covers more and more ground by the cumulative coverage shows a bias to the main roads, or arteries at the expense of the smaller and surrounding roads. In FIG. 3, arteries [304] and [305] are heavily traversed by the scanning vehicles resulting in a healthy amount of scanning data for those streets. But streets [306] and [307] are rarely, if ever, covered because there is no frequent destination on those streets and the arteries are more optimal travel roads. The result is that access points [308] and [309] are not scanned at all by the scanning vehicles so the positioning system will struggle to identify a user who is traveling on streets [306] and [307]. The result is that when the system attempts to calculate the location of the access point from the scan data it is limited to a biased collection of input data. FIG. 11 shows the difference in resulting data quality. As the scanning vehicle drives near the Access Point [1101], it records a reading and its location continuously. The positioning system must then calculate the location of the Access Point [1102] using the entire set of observed data [1103]. In the Random Scanning model the set of data is limited to one main road passing by the access point. That forces the system to calculate the access point's location near that road rather than close to the access point itself.

Figure 4:
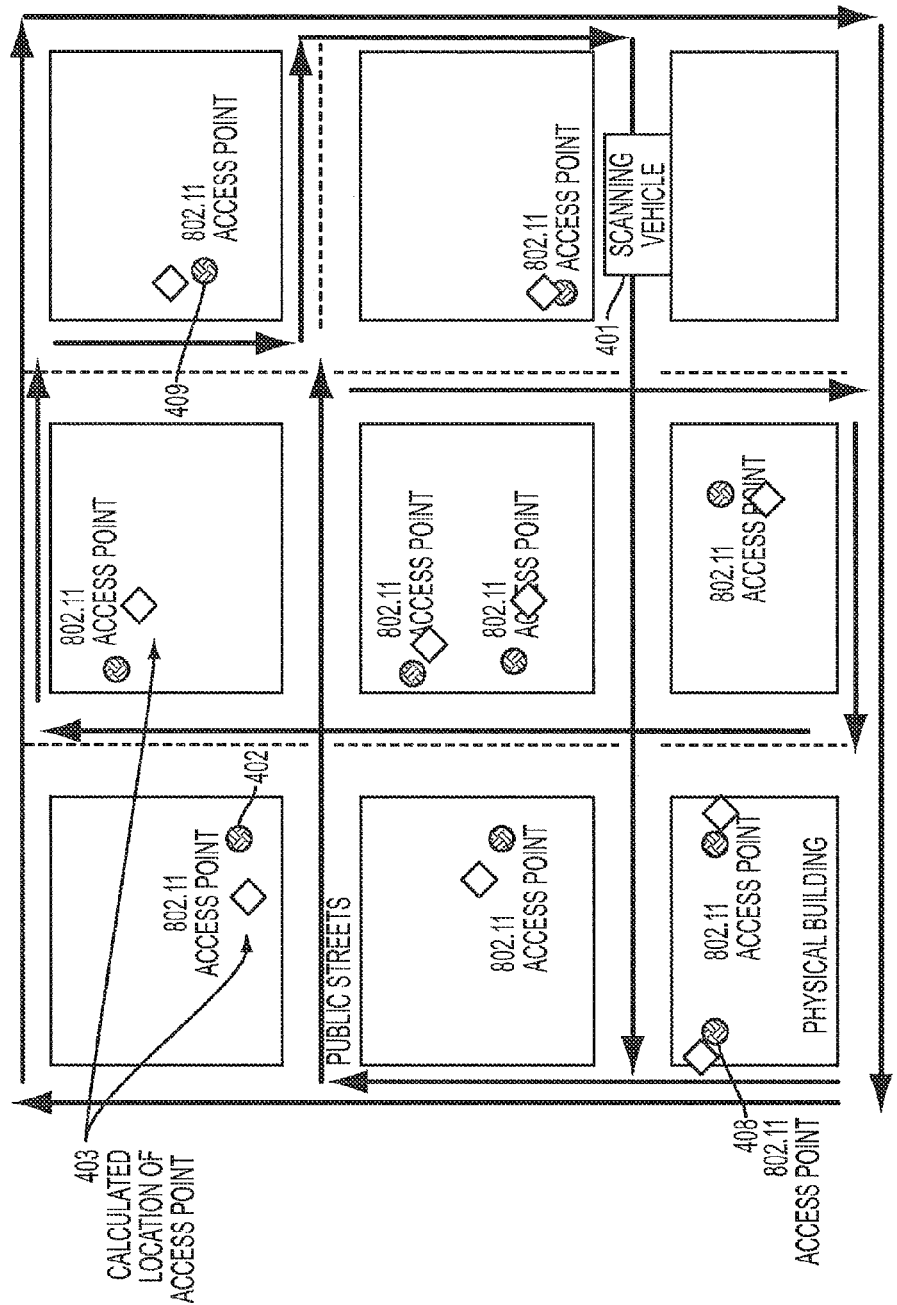
FIG. 4 depicts an example using a programmatic route for a scanning vehicle according to certain embodiments of the invention.

Another approach is develop routing algorithms that include every single street in the target area so as to avoid arterial bias in the resulting collection of data thus producing a more reliable positioning system for the end users. FIG. 4 describes an optimized routing algorithm known as the Chinese Postman to calculate the most efficient driving route for covering every single street in a target area. The Chinese Postman routing algorithm is a known technique used by postal agencies, utilities and census agencies and is a variant of the Eulerian cycle problem. The Eulerian cycle is a problem asking for the shortest tour of a graph which visits each edge at least once. (See, e.g., Kwan, M. K. "Graphic Programming Using Odd or Even Points." *Chinese Math.* 1, 273-277, 1962.) Preferred embodiments of the invention include a methodology for identifying a target region for coverage and then using the Chinese Postman routing algorithm for planning the vehicle route. The scanning vehicle [401] follows the optimal route according to the algorithm showing no bias to any street ensuring that all observable access points are detected and mapped by the system. So, by way of example, access points [408] and [409] are added to the access point database using the Chinese Postman model but would have been missed using the Random model.

Referring back to FIG. 11, with the Chinese Postman Scanning model, the vehicle travels every single road getting as complete a set of scanning records [1106] for the Access Point [1104]. The system can then calculate the location [1105] of the access point with less error since it has a more uniform distribution of scan data for access point 1104 than for access 1102. So the Chinese Postman Scanning model not only gathers more access points uniformly across a target area but the resulting data produces more accurate calculations of access point locations.

Higher Quality AP Locations

Once collected (or partially collected), the scanning data is uploaded back to a central access point database (described later in this application) where it is processed. The raw observation points for each access point are used to reverse triangulate the actual physical location of the access points or create a power profile representing the radio propagation of that access point. In order to produce the most accurate calculated location for a particular access points or to create the most accurate power profile, the scanning vehicle must observe the access point from as many different angles as possible. In the random model [FIG. 3], many access points are observed from only one street forcing the system to calculate their location directly on the street [303]. These locations exhibit a directional bias and are significantly different than the actual locations of these access points [302]. Errors are introduced into a positioning system when its reference point locations are inaccurate. So in this positioning system, the accuracy of the access point locations play a large role in the accuracy of the end user positioning accuracy. Using the Chinese Postman model [FIG. 4] the scanning vehicles detect a particular access point from as many sides as possible of the building housing the access point. This additional data greatly improves the results of the reverse triangulation formula used to calculate the location of the access points [403]. More details on the access point location quality is described in connection with FIG. 11.

The scanning data collected from this system represents a reliable proxy for the signal propagation pattern for each access point in its specific environment. Every radio device and associated surrounding environment produces a unique signal fingerprint showing how far the signal reaches and how strong the signal is in various locations within the signal fingerprint. This fingerprint data is used in conjunction with the calculated access point location to drive high accuracy for the positioning system. This fingerprint is also known as a "power profile" since the signal strengths at each position is measured as signal power in watts. The positioning system can interpret the fingerprint data to indicate that a particular signal strength of an 802.11 access point radio is associated with a particular distance from that access point. Signal fingerprinting techniques are used in indoor Wi-Fi positioning but have proved difficult to replicate in the wider area outdoor environments because the difficulty associated with collecting the fingerprint data. When the fingerprints or power profiles of multiple access points are overlaid, the positioning system can determine a device location merely by finding the one position where the observed signal strengths match the combined fingerprints. Preferred embodiments of this invention provide a reliable system for obtaining this fingerprint data across a massive coverage area with millions of access points in order to utilize fingerprint-based positioning algorithms.

Reference Symmetry

Positioning systems typically work by having three or more reference points around the device being tracked.

Figure 5:
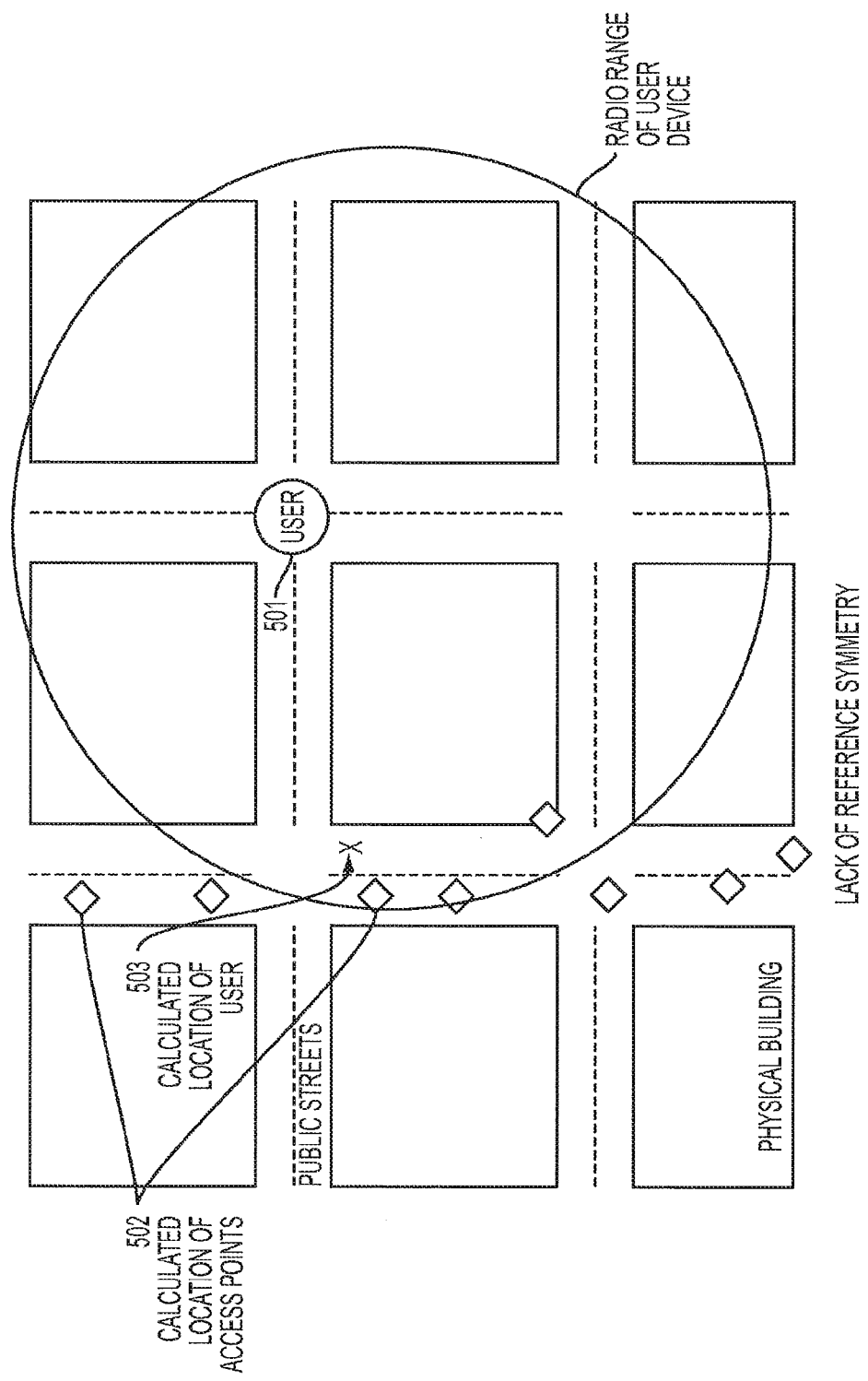
FIG. 5 depicts an example scenario to illustrate the problem of lack of reference symmetry of Wi-Fi access points in locating a user device.
Figure 6:
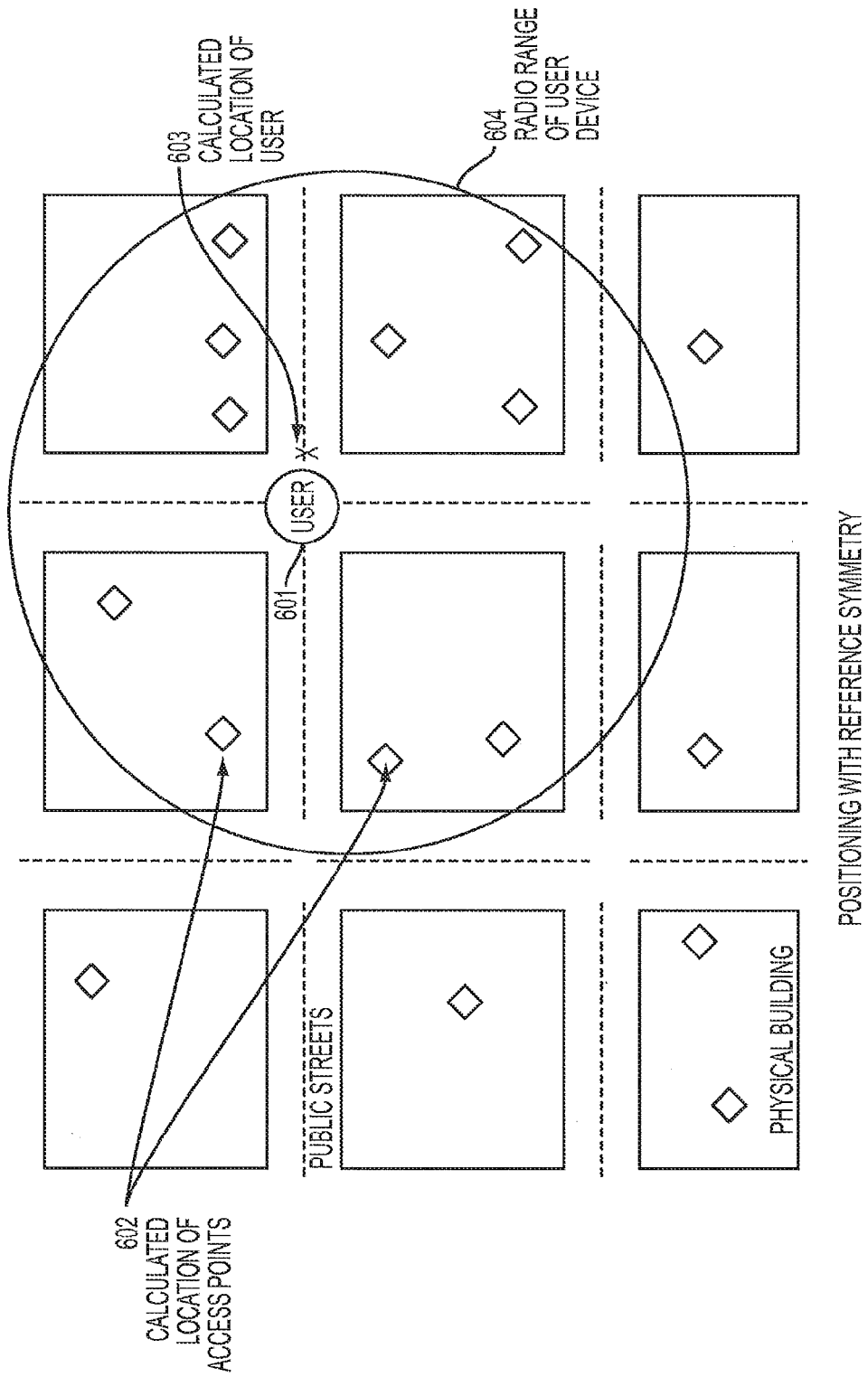
FIG. 6 depicts an example scenario to illustrate reference symmetry of Wi-Fi access points in locating a user device.

These positioning systems use the radio signals from these reference points in various ways to calculate the device's current location. Significant errors occur when there are an insufficient number of reference points or when the reference points lack balance or symmetry around the user. As illustrated in FIG. 5, the arterial bias that emerges from the random model introduces many scenarios where the end user [501] moves into physical areas in which there are only recorded access point locations [502] on one side of them. This lack of symmetry in the distribution of reference points around the end user causes the positioning algorithms to calculate the device location [503] with a great deal of error. With Chinese Postman model of scanning for access points, the user typically encounters a physical location [FIG. 6] in which there are numerous access point locations [602] on all sides of the user [601] within the range [604] of the device's 802.11 radio. The resulting position calculation [603] has reduced location bias and is more accurate as a result. FIG. 11 is another example showing the impact of quality location calculations.

Scanning Device

Figure 7:
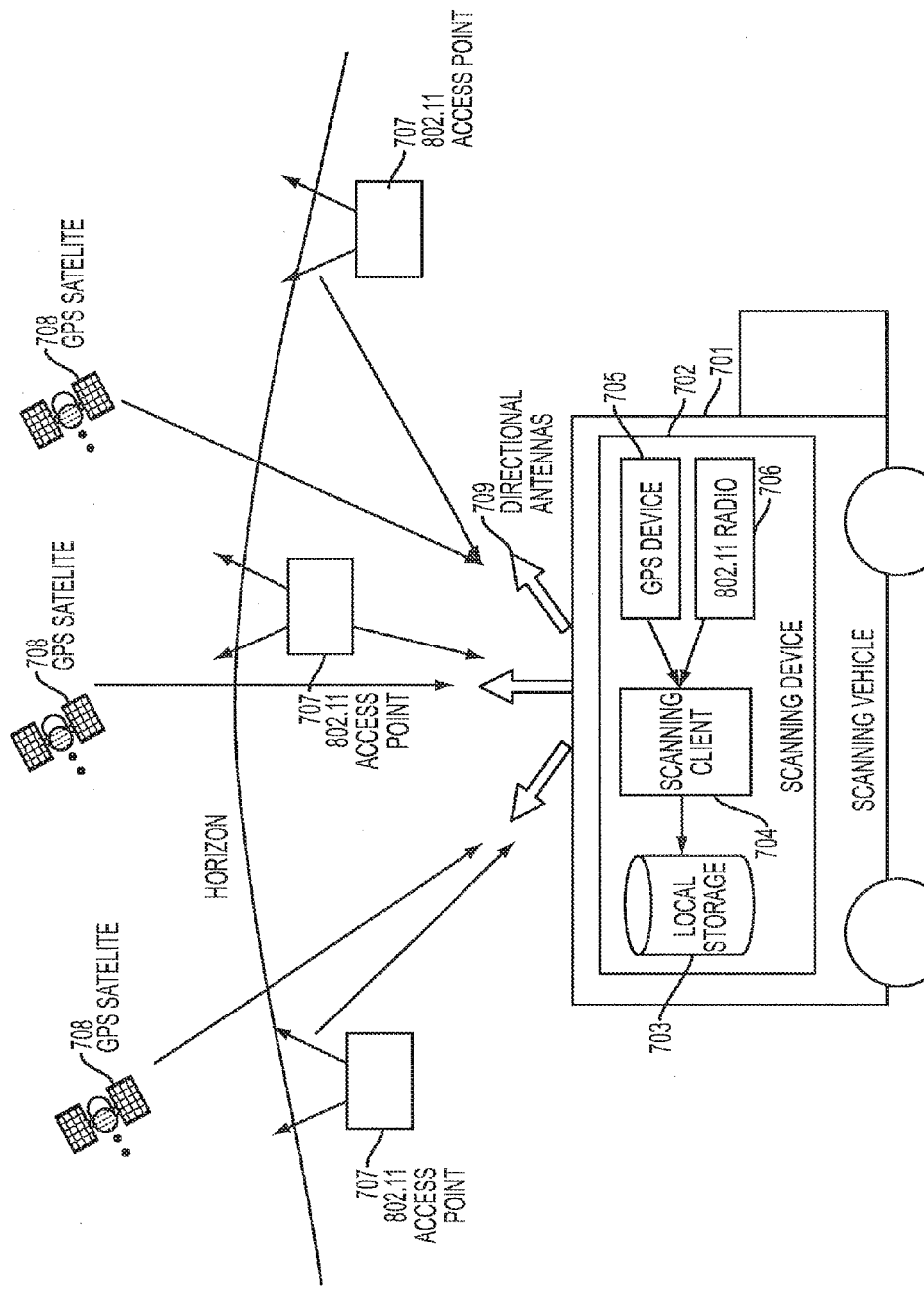
FIG. 7 depicts scanning vehicles including scanning devices according to certain embodiments of the invention.

FIG. 7 depicts the details of a preferred embodiment of a scanning device 702 used to detect and identify the various Wi-Fi access points. A scanning vehicle [701] contains a scanning device [702] that continuously scans the airways for radio signals from GPS satellites [708] and 802.11 access points [707]. The scanning device runs the scanning client software [704] that controls the entire process. The scanning client activates both the GPS receiver [705] and the 802.11 radio [706]. The GPS receiver is set into a continuous reception mode calculating the geographic location of the device every second. That calculation is read by the scanning client and stored in the local data storage [703]. The scanning client initiates the 802.11 radio and begins sending out 802.11 probe requests using directional antennas [709]. Any 802.11 access point [707] within range of that probe request responds with a signal beacon as per the 802.11 protocol. The responding signal beacons contains the network name of the access point (known as an SSID), the MAC address of the access point device as well as other meta information about the access point. The responding signals reach each of the directional antennas with a different strength of signal based on the vector of origin and the proximity of the access point. That vector is recorded along with the identifier of that particular antenna and the meta information about the access point. This probe-receive-record process occurs continuously every tenth of a second. The scanning device deployed is a combination of the iPAQ 4155 Pocket PC and Powered GPS PDA Mount Cradle with integrated SiRF II type GPS receiver with XTrac v. 2.0 firmware.

Figure 10:
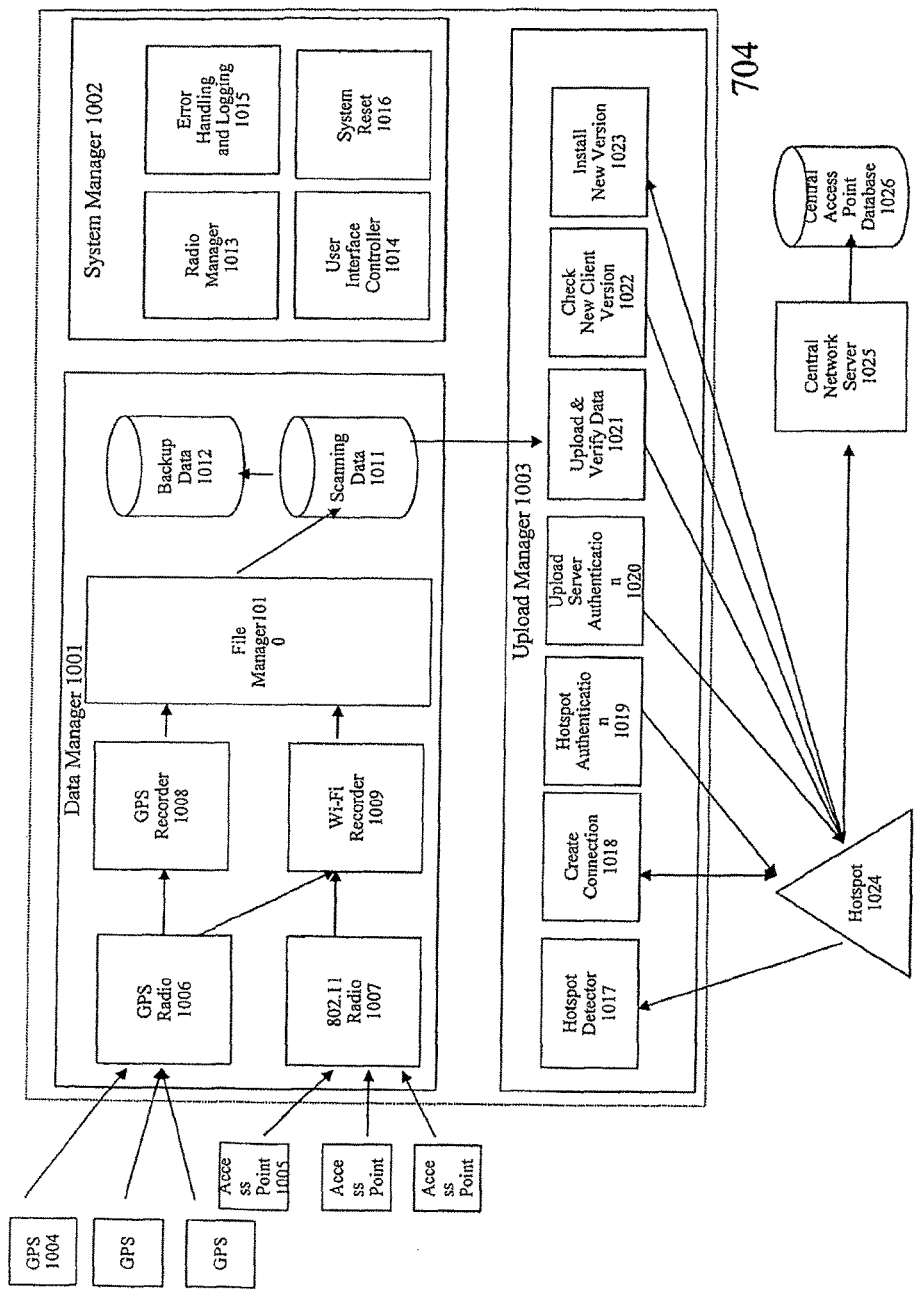
FIG. 10 depicts an exemplary architecture of a scanning client according to certain embodiments of the invention.

The Scanning Client 704 of certain embodiments is described in connection with FIG. 10. The client consists of three main components, the Data Manager [1001], the System Manager [1002] and the Upload Manager [1003]. The Data Manager [1001] controls the operations of both the GPS radio [1006] and the 802.11 radio [1007]. The Data Manager controls when and how often these radios scan for signals and process those signals. The GPS radio once activated receives signals from GPS satellites [1004] and calculates its geographic location. The GPS recorder [1008] logs all of those readings every second and sends them to the File Manager [1010]. The Wi-Fi Recorder [1009] activates the 802.11 Radio to scan every tenth of a second, and associates those 802.11 readings with the GPS readings coming from the GPS radio and sends the resulting data to the File Manager. The File Manager receives scan data from both the GPS Recorder and Wi-Fi Recorder and creates storage files on the device. This process continues the entire time the device is operational and both radios are functioning In the Upload Manager [1003] there is a Hotspot Detector [1017] that monitors the 802.11 scanning results to look for the configured network of public hotspots [1024] (e.g. T-mobile) that the device is authorized to access. Once it detects a valid Hotspot it notifies the user of its presence. The user can select to connect to the hotspot by activating the Create Connection component [1018]. This component associates with the hotspot's access point and creates an 802.11 connection. Then the Hotspot Authentication module [1019] supplies valid authentication information for the device. The hotspot validates the account and then provides network access to the device. The Upload Manager then initiates the Upload Server Authentication process [1020] to connect to the Central Network Server [1025] and provides valid authentication information. Once authenticated, the Upload & Data Verification module [1021] is initiated. This module retrieves the scan data from the Scanning Data store [1011] and uploads the data to the Central Network Server using FTP. The Central Network Server initiates a process to store all the data in the Central Access Point Database. After the upload is complete the upload process moves the scan data from the Scanning Data store [1011] to the Backup Data store [1012] on the device. Once the upload is completed and verified, the New Version module [1022] checks the Central Network Server to determine if there is a new version of the client software available for the device. If there is a new version, the software is downloaded and the New Version Installation [1023] process begins to upgrade the client software. Once the installation process is completed the connection with the Central Network Server is terminated, the connection with the hotspot is terminated and the device returns to normal scanning operation.

Included in the Scanning Client 704 are a set of utilities that help to manage the device and reduce system errors. The Radio Manager [1013] monitors the operation of the GPS Radio and the Wi-Fi Radio to make sure they are functioning properly. If the Radio Manager encounters a problem with one of the radios, it will restart the radio. The User Interface Controller [1014] presents the tools and updates to the user so they can operate the device effectively. The Error Handling and Logging [1015] records all system issues to the device and alerts the user so they can address. The System Restart module [1016] is called when issues cannot be resolved. This module shuts down the device and restarts the hardware, operating system and scanning client to ensure proper operation.

The $\frac{1}{10}$ of a second 802.11 scanning interval was chosen since it provides the optimal scanning period for 802.11 under these conditions using off the shelf hardware. 802.11b/g/n operates using 14 channels of the unlicensed spectrum. An individual access point broadcasts its signal beacon over one of those channels at any given time. The scanning device needs to survey each channel in order to observe as many access points as possible. The scanning interval is correlated with the average speed of the scanning vehicle to optimize how the scanning client covers the frequency real estate of a particular region.

Central Network Server

Figure 8:
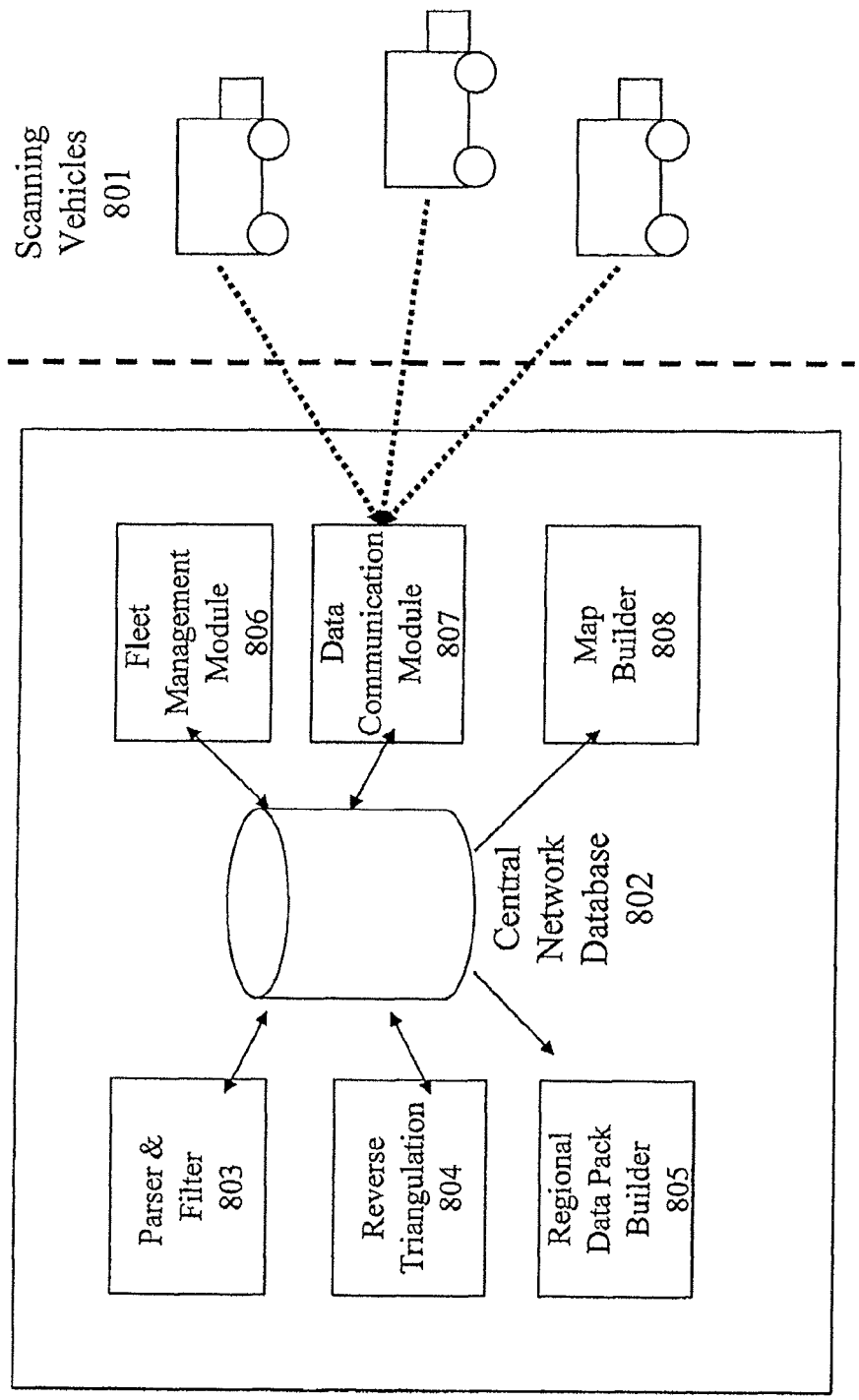
FIG. 8 depicts a central network server including a central database of Wi-Fi access points according to certain embodiments of the invention.

With reference to FIG. 8, the fleet of vehicles perform their scanning routines while driving their pre-designed routes. Periodically each vehicle [801] will connect to an available 802.11 access point and authenticate with the Data Communications Module [807] of the Central Network Server. Typically the access points used for communicating with the Central Network Server are public hotspots like those operated by T-Mobile ensuring reliable and metered access. The provisioning of this connection could be done via any available public access point. The scanning vehicle stops at a nearby hotspot location and begins the process of connecting to the access point. Once authenticated, the scanning client [704] identifies all the recently collected scan data from the local storage [703] and uploads that data to the Central Network Database [802].

Once the data has been uploaded to the database, the Parser and Filter process [803] begins. The Parser and Filter process reads all of the upload scanning data and loads it up into the appropriate tables of the database. During this exercise the data is evaluated for quality issues. In some cases the GPS receiver may record erroneous or error records for some period of time, which could negatively affect the final access point location calculation. The parser and filter process identifies these bad records and either corrects them or removes them from the system. The filtering process users clustering techniques to weed out error prone GPS readings. For example, if 90% of the readings are within 200 meters of each other but the remaining 10% of the readings are 5 kilometers away then those outliers are removed by the filter and stored in a corrupted table of the database for further analysis. In particular, the system first calculates the weighted centroid for the access point using all reported data. It then determines the standard deviation based on the distribution of the reported locations. The system uses a definable threshold based on the sigma of this distribution to filter out access points that are in error. Once these error records are marked, the centroid is recalculated with the remaining location records to determine the final centroid using the Reverse Triangulation method described below.

Note that the error records may be the result of an access point that has moved. In this instance, the centroid for the access points will quickly "snap" to the new location based on the preponderance of records. An additional enhancement to the algorithm would include a weighting value based on the age of the records such that new records represent a more significant indication of the present location for a given access point.

Once the parsing process has been completed the central network system initiates the Reverse Triangulation model [804] begins processing the new data. During this process I) new access points are added to the database and their physical location is calculated and 2) existing access points are repositioned based on any new data recorded by the scanners. The reverse triangulation algorithm factors in the number of records and their associated signal strengths to weight stronger signal readings more than weaker signals with a quasi weighted average model.

During data gathering, a WPS user is equipped with a Wi-Fi receiver device which measures Received Signal Strength (RSS) from all the available Wi-Fi access points, and then extracts location information of corresponding access points. The measured RSS value of access point i is denoted RSSi.

If the corresponding recorded GPS location of access point i is denoted by {Lati, Longi}, and the calculated access point location is denoted by {Lati, Longi}, the triangulated position is found by applying the algorithm as follows:

$$Lat_u = \frac{\sum_{i=1}^{n} \sqrt[4]{10^{RSS_i/10}} \, Lat_i}{\sum_{i=1}^{n} \sqrt[4]{10^{RSS_i/10}}}$$

$$Long_u = \frac{\sum_{i=1}^{n} \sqrt[4]{10^{RSS_i/10}} \, Long_i}{\sum_{i=1}^{n} \sqrt[4]{10^{RSS_i/10}}}$$

The quad root of power is selected to ease the implementation of the algorithm, since quad root is synonymous to taking two square roots.

The second point is referring to adjusting the dynamic range of coefficients. If the dynamic range of coefficients is a concern, the coefficient of the algorithm can be divided by a constant number, e.g., $$Lat_u = \frac{\sum_{i=1}^{n} \frac{\sqrt[4]{10^{RSS_i/10}}}{c} Lat_i}{\sum_{i=1}^{n} \frac{\sqrt[4]{10^{RSS_i/10}}}{c}}$$

$$Long_u = \frac{\sum_{i=1}^{n} \frac{\sqrt[4]{10^{RSS_i/10}}}{c} Long_i}{\sum_{i=1}^{n} \frac{\sqrt[4]{10^{RSS_i/10}}}{c}}$$

The Parameter C can be any number and it does not impact the results, theoretically. Since, the weighted average is based on the ratio of the coefficients and not the absolute value, theoretically, dividing all the coefficients by a constant value, C, does not impact the results, but it changes the dynamic range of the coefficient values.

This final {Lati, Longi} is then used as the final centroid value for the location of that access point. The latitude and longitude will then be stored in the database including a timestamp to indicate the freshness of the triangulation calculation.

After the Central Network Database has been updated and each access point has been repositioned, the Data Pack Builder [805] creates subsets of the database based on regions of the country or world. The pack builder facilitates distribution of the database for a variety of use cases in which only region certain geographies are of interest. The pack builder is configured with region coordinates representing countries, time zones and metropolitan areas. Utilizing this technique a user can download just the location data for the west coast of the United States. The pack builder segments the data records and then compresses them.

The Fleet Management Module [806] helps operations personnel manage the scanning vehicles and ensure they are adhering to the routing procedures. This module processes all the scan data and builds the location track for each vehicle in the system. The operations manager can create maps of the vehicle track using the Map Builder [808] to visually inspect the coverage for a particular region. The GPS tracking data from each device is reviewed with route mapping software to verify completion of coverage and to identify missed areas. This ability to audit and verify uniform coverage ensures that the system is getting the best data possible. The module also calculates the driving time of the vehicle to determine average speed and to subtract any idle time. These outputs are used to monitor efficiency of the overall system and in planning of future coverage.

Related Methods and Techniques

The techniques disclosed herein can be used with methods, systems, and devices described in related applications discussed below, all of which are incorporated by reference herein. As set forth above, embodiments of the invention select position estimation techniques based on the number of detected access points within range of the client device. Such techniques can include those set forth in U.S. patent application Ser. No. 11/430,222, entitled Estimation of Position Using WLAN Access Point Radio Propagation Characteristics In a WLAN Positioning System, filed on May 8, 2006, and U.S. patent application Ser. No. 11/774,392, entitled System and Method of Gathering WLAN Packet Samples to Improve Position Estimates Of WLAN Positioning Device, filed on Jul. 6, 2007. For example, those applications describe methods and systems for determining anticipated received signal strength readings for a given Wi-Fi Access Point depending on the client device's position relative to a particular Wi-Fi Access Point. In addition, those applications disclose techniques for improving the position estimates of a client device by evaluating multiple packet transmissions from a single access point.

While embodiments of the invention described herein are presented as useful for estimating the position of a user device, embodiments can also be used in combination with techniques disclosed in U.S. patent application Ser. No. 11/430,079, entitled Estimation Of Speed and Direction of Travel In A WLAN Positioning System, filed on May 8, 2006, U.S. patent application Ser. No. 11/696,832, entitled Time Difference of Arrival Based Estimation of Speed in a WLAN Positioning System, filed on Apr. 5, 2007, and U.S. patent application Ser. No. 11/696,833, entitled Time Difference of Arrival Based Estimation of Direction of Travel in a WLAN Positioning System, filed on Apr. 5, 2007. Those applications describe methods of determining the speed and direction of travel of the user device. As discussed in more detail below, techniques set forth in the present application describe methods of subdividing the collection of Wi-Fi Access Point information into subsets for use by a client device. The methods and systems for determining the speed and/or direction of travel of the client device in the above incorporated application can be used to prioritize which subsets of Wi-Fi Access Point information should be provided to the client device. For example, information about Wi-Fi Access Points in an area into which the client device is likely to arrive, based on the device's current speed and direction of travel, can be provided to the client device in advance of its arrival in that particular area.

In addition, access points in the database may move, or new access points may be detected in the area of interest by client devices. The information associated with such access points may be corrected or updated, or the access point information may be disregarded for location estimation purposes, according to the techniques disclosed in U.S. patent application Ser. No. 11/359,154, entitled Continuous Data Optimization of Existing Access Points In Positioning Systems, filed on Feb. 22, 2006. As described in greater detail below, aspects of the present invention include designating when information about a particular access point has been changed or updated. Thus, the techniques described in the above application can also be used in conjunction with these aspects. Similarly, embodiments described in U.S. patent application Ser. No. 11/678,301, entitled Methods and Systems For Estimating a User Position In a WLAN Position System Based On User Assigned Access Point Locations, filed on Feb. 23, 2007, can also be used in combination with the techniques discussed herein to estimate the position of the client device.

U.S. patent application Ser. No. 11/430,224, entitled Calculation of Quality of WLAN Access Point Characterization for Use In a WLAN Positioning System, filed on May 8, 2006, and U.S. patent application Ser. No. 11/625,450, entitled System and Method for Estimating Positioning Error within a WLAN Based Positioning System, filed on Jan. 22, 2007, disclose techniques for evaluating the quality of information about a given access point and for determining the positioning error associated with a given position estimation. These techniques can be used with embodiments of the present invention. For example, certain Wi-Fi Access Point information may not be provided to the client device because the information has been determined to be of low quality and, therefore, of low reliability for use in position estimation. Likewise, the error associated with a given position estimation can be a factor in determining what subset of access point information to provide to a client device.

The information about Wi-Fi Access Points may be encoded and compressed as set forth in U.S. patent application Ser. No. 11/365,540, entitled Encoding and Compressing a WiFi Access Point Database, filed on Mar. 1, 2006.

Efficient Management and Distribution of Wi-Fi Access Point Data

Preferred embodiments of the present invention also provide a system and a methodology for efficiently managing and distributing Wi-Fi location data among the various components of a Wi-Fi positioning system. In such embodiments, the client stores a cache of Wi-Fi access point data that it uses to locate itself. As mentioned above, Wi-Fi access point data is constantly changing as the access points themselves are activated, moved, and decommissioned. Client devices must be made aware of these changes in an efficient manner to ensure that the WPS functions at a high level of accuracy.

Figure 12:
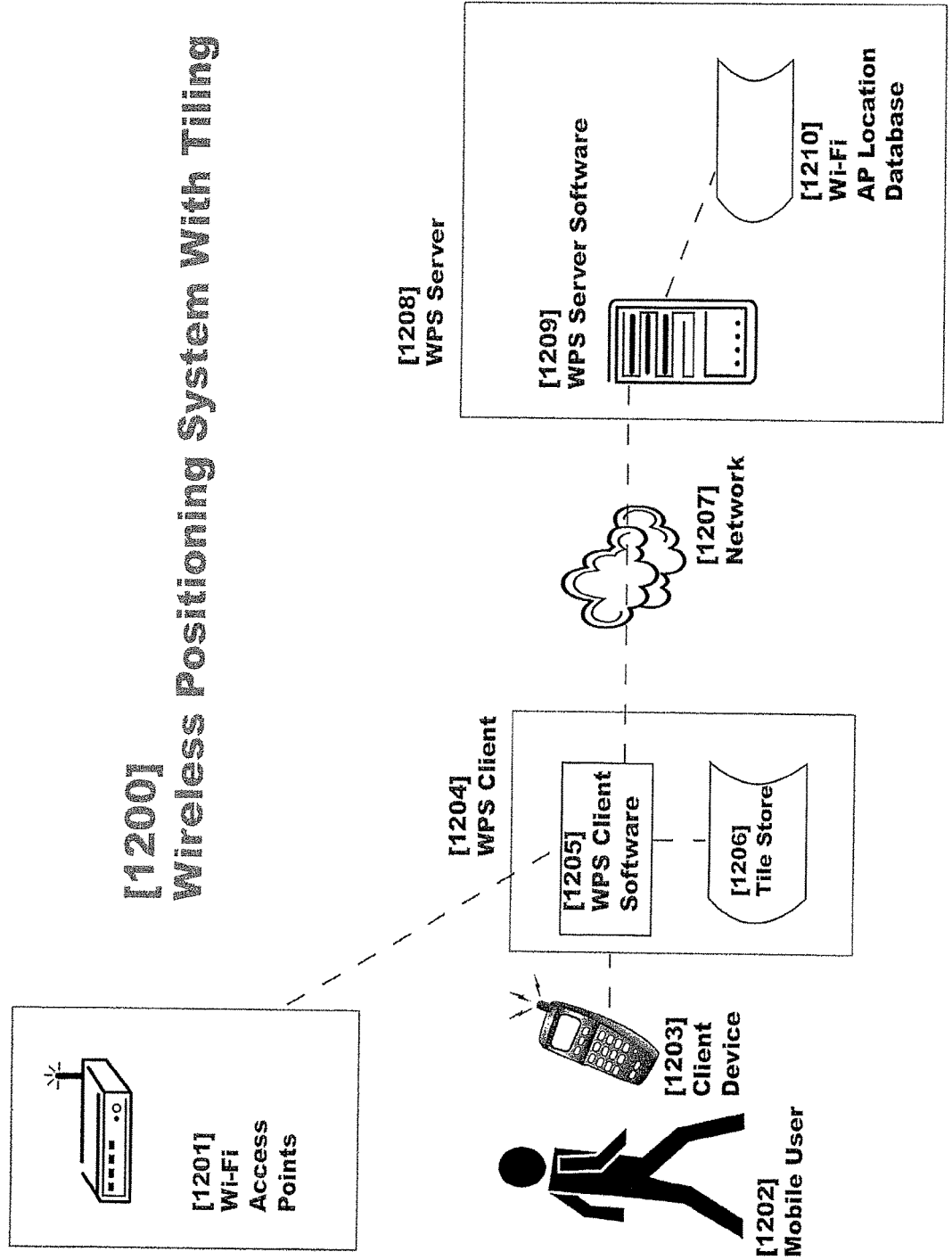
FIG. 12 depicts certain embodiments of a Wi-Fi positioning system.

FIG. 12 depicts a common scenario of use for certain embodiments of the invention. A mobile user [1202], making use of a mobile device [1203], requires information related to the device's (i.e., the user's) current geographic location. A client device is generally a mobile computing device (e.g. a mobile phone) that is being operated by the mobile user. The client device is equipped with WPS client software [1204]. The WPS client software has the capability to operate autonomously or by communicating with a WPS server [1208].

The WPS client can also operate semi-autonomously by receiving Wi-Fi access point data from the server corresponding to a set of "tiles" that represent Wi-Fi data for a limited geographic area. This data is then stored locally on the client device in the Tile Store [1206], which the WPS client may then use to estimate its location autonomously.

The client may also be preinstalled with Wi-Fi data corresponding to a specified geographical region. The client may then use the database to update this preinstalled data, ensuring that its location estimates are based on the most current data.

WPS Tiles and TileIDs

The basic unit for access point information transfer between the Network Server [1208] and the Mobile Device [1203] is a Wireless Positioning Tile (WPS Tile). A WPS Tile (or simply a "tile") is a geographically bounded subset of the Wi-Fi Access Point Location Database, that refers to a set of Wi-Fi access points that are within a bounded geographic region, defined by reference to latitude and longitude coordinates.

While the access point database may include elevation information, making it possible to locate client devices in three dimensions, the tiling system partitions the database using only the longitude and latitude dimensions. Since all Wi-Fi access points are relatively close to the ground, it is not necessary for the tiling system to take the elevation dimension into account, though elevation information may still be used in estimating the location of a client device.

Tiles have several properties that are necessary for creation, identification and maintenance. These properties include:

Stability—identifiers for tiles remain the same over time;
Divisibility—Tiles can be subdivided or recomposed as needed for storage space and density requirements;
Composability—Tiles can be composed into their parent tiles using reproducible identifiers. Child tiles can easily identify their parent tiles and vice versa; and
Universality—Tiles must be able to represent all geographic latitude and longitude coordinates within the coverage of the WPS system.

WPS Tiles are generated based on a method (described below) for dynamically subdividing the database based on the capacity and needs of a client device as well as the density of the Wi-Fi access points in a given geographic region. WPS Tiles are generated on the Central Server and distributed to Client Devices.

While a specific method of implementing tiles that satisfies this set of requirements is demonstrated in this document, there are a number of different algorithms which can be employed to achieve the same purpose. The present method represents only one of many possible embodiments of this aspect of the invention that satisfies the desired characteristics of stability, divisibility, composability, and universality.

A tile is referenced by a WPS Tile Identifier called a TileID. The TileIDs formed using the process described herein encode not only a latitude and a longitude but also the size minimum bounding rectangle (MBR) for the region of the corresponding tile by identifying the "level" of the corresponding tile. In this embodiment, tiles are arranged in a hierarchy, in which each tile has a prescribed "level". A level-0 tile contains multiple level-1 tiles; a level-1 tile contains multiple level-2 tiles, etc. The method described herein stores and manipulates TileIDs in hexadecimal format, using the digits 0-9 and A-F.

Figure 20:
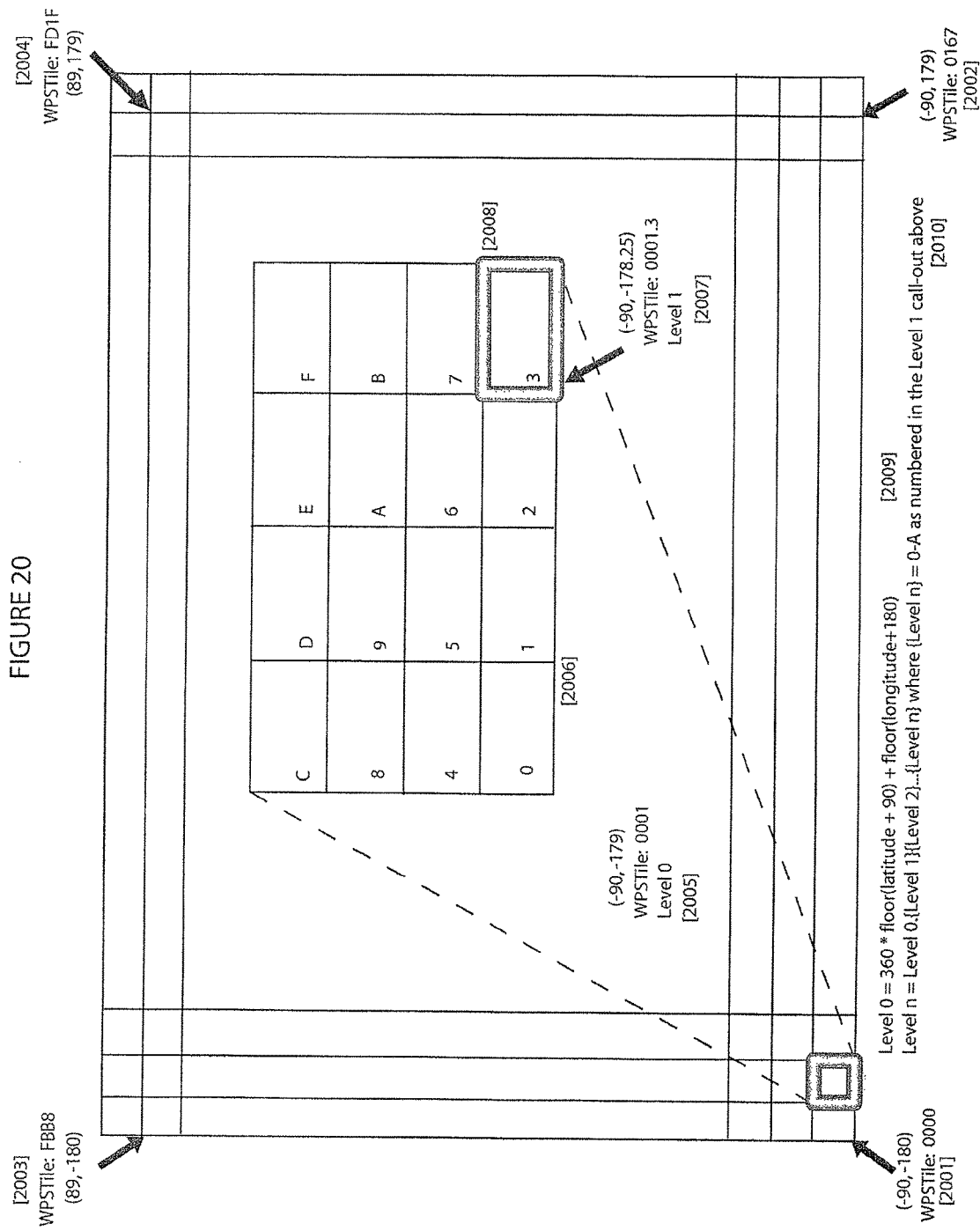
FIG. 20 depicts a scheme for partitioning the surface of the Earth into a hierarchy of polygonal tiles and a scheme for generating a global unique identifier corresponding to each of these tiles.
Figure 21:
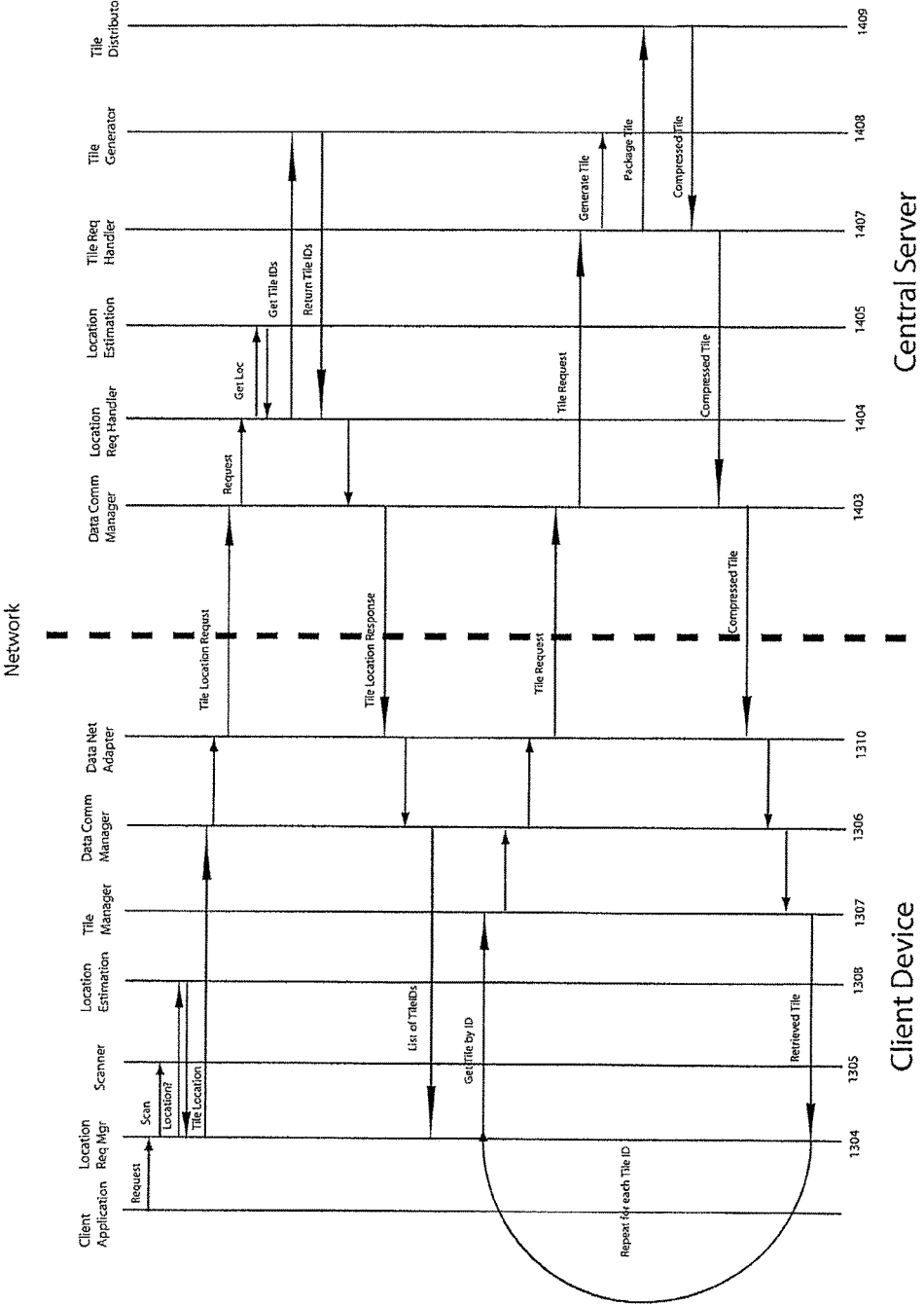
FIG. 21 depicts the communications between various components of a Wi-Fi positioning system during normal operation, according to certain embodiments of the invention.
Figure 22:
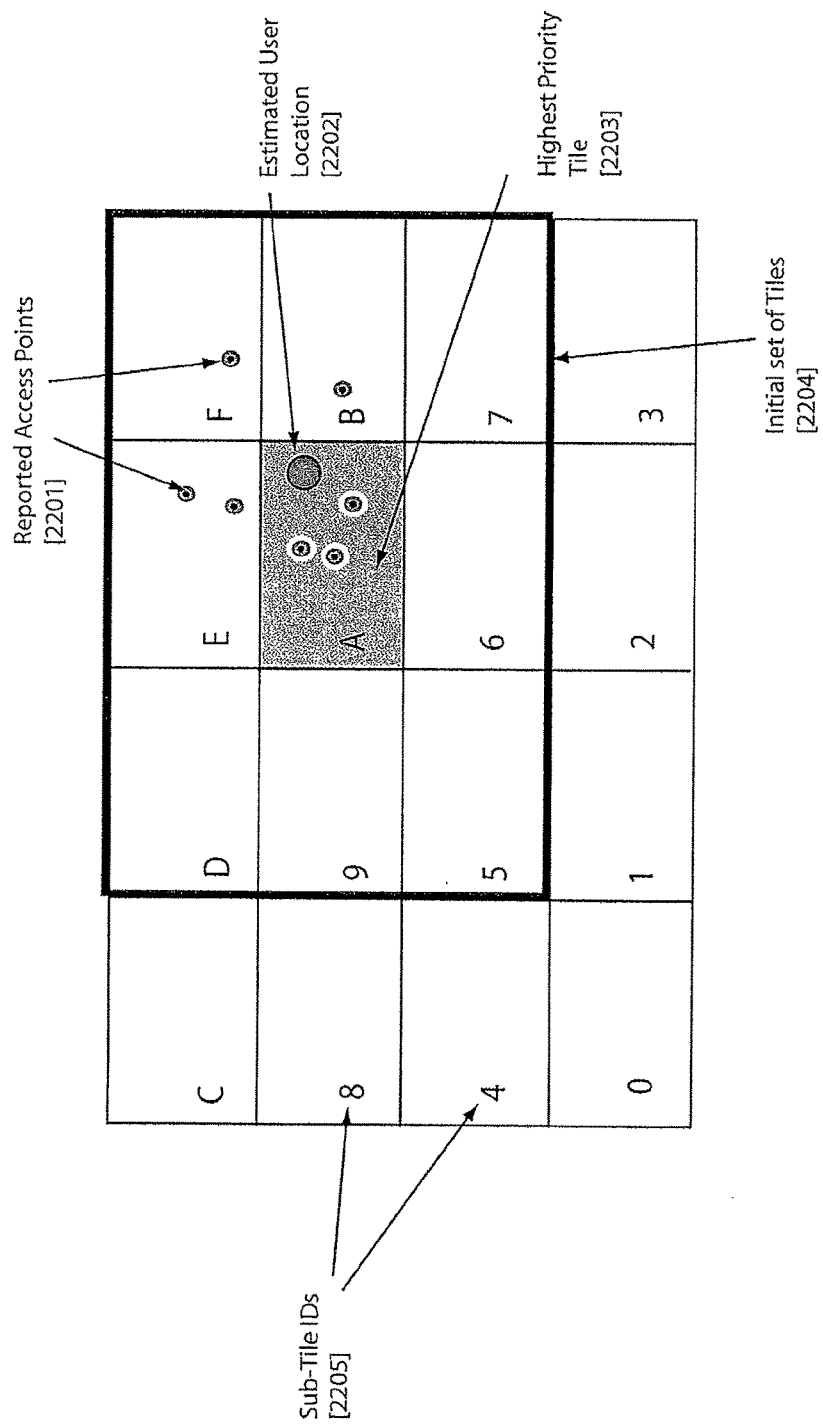
FIG. 22 depicts some of the tiles recommended by the server component of a Wi-Fi positioning system in response to a client location request, according to certain embodiments of the invention.

Level-0 tiles (the largest WPS Tiles) are bounded by integer degree of latitude/longitude as illustrated in FIG. 20—i.e. each tile is a rectangle whose left and right sides represent exactly one degree of longitude and whose top and bottom sides represent exactly one degree of latitude. There are 180 degrees of longitude and 360 degrees of latitude; hence, there are 180*360=64,800 Level 0 Tile IDs in the world. Level 0 TileIDs are numbered from left to right (west to east) and bottom to top (south to north). The first level-0 tile, ordered by TileID, is at latitude −90 and longitude −180 [2001]. The last level-0 tile is at latitude 89 and longitude 179 [2004]. The formula for calculating Level-0 TileIDs given a latitude and longitude is:

Tile ID(lat,lon)=360*floor(90+lat)+floor(180+lon)

As described above and illustrated in FIG. 20, level-N tiles can be subdivided into multiple sub-tiles of level N+1. The particular implementation described herein divides level-N tiles into 16 (4×4) level-N+1 sub-tiles [2006]. Sub-tiles are numbered from left to right (west to east) and bottom to top (south to north), using the hexadecimal digits 0-9 and A-F. Sub-sub-tiles of sub-tiles are numbered by simply adding the appropriate hexadecimal digit to the Sub-tileID. For example, the TileID BAOC.76D refers to one of the 16 sub-tiles of the tile whose TileID is BAOC.76. Thus, the number of digits that appear after the "." in the TileID is equal to the level of the corresponding tile.

Subdivision of each tile into 16 sub-tiles has several advantages. First, it provides for automatic decomposition of the tiles, allowing for a quick subdivision of the world into tiles with the desired average number of access points per tile. If, after more access points are activated, the density of access points per tile exceeds the maximum desired density, tiles at a higher level (i.e. smaller tiles) can be used. If enough access points are decommissioned to bring the number of access points below the minimum desired density, lower-level tiles (i.e. larger tiles) may be used. This gradual decomposition provides for a suitable distribution of the access point data set based on the variations in density of access points found throughout the world.

Second, the use of 16 sub-tiles per tile provides an encoding that is optimized for computer manipulation. Each of the 16 sub-tiles can be encoded in a single hexadecimal digit (0-F), optimized for binary encoding in as few as 4 bits. This encoding provides optimum efficiency in both storing and processing WPS TileIDs. Further, the encoding is such that the TileIDs of tiles at level N have one fewer hexadecimal digit than tiles at level N+1. Thus, the level of a tile is easily identifiable based on the number of digits in the corresponding TileID.

A further desirable property of the described TileID system is that when a first TileID is the prefix of a second TileID, the first tile contains the second tile. For example, the tile identified by TileID BAOC.76 contains all 16 sub-tiles that begin with the same prefix: BAOC.760, BAOC.761, . . . , BAOC.76F.

Each tile is also associated with version information that reflects the characteristics of the tile at each time the tile data was updated. This information may include: (i) the time the tile data was updated (i.e. the tile timestamp). This can be used to quickly determine whether the client has the latest tile data in its Tile Store; (ii) metrics indicating how often the environment within the tile changes, e.g. the rates at which new Wi-Fi access points enter the tile, leave the tile, or move within the tile. This can be used by the client to autonomously estimate the rate at which the tile data is aging; (iii) identifiers which compactly indicate the set of access points within the tile, e.g. Bloom Filters or other set encodings, or one-way hashes (such as MD5, SHA-1) of the MAC addresses and locations of the Wi-Fi access points. This can be used to determine the best method to update the client's cache, i.e. whether to incrementally update the tile data (see below), or to replace the tile data entirely with a new tile sent by the server.

The version information is used to ensure that the client does not use cached information that is out-of-date when estimating its location, and to facilitate the tile data transfer process. For a given tile in the Tile Store, the client may request that the server send the tile's version information. The version information returned by the server in combination with the version information on the client indicates whether new tile data must be loaded into the client, as well as the best method to use in performing the update. In one embodiment, if the timestamp information indicates that the tile data on the database server is newer than the tile data in the client's Tile Store, the client might update its cache by downloading the newer version from the database server. This process may be triggered periodically by the WPS Client Software, or as needed to satisfy a Location Request.

Although TileIDs may be trivially compared to determine which tiles are contained by other tiles, there may also be a need to determine the set of tiles adjacent to a given tile contained within the database server. Given that the adjacent tiles may be of an unknown and unbounded level, in some preferred embodiments of the tile database (either the server database or the client's Tile Store), there is no trivial way to make this determination. Some methods include: (i) searching for access points that are in the general vicinity of a tile, and retrieving the corresponding TileIDs; (ii) searching for tiles at higher levels, and incrementally expanding the search to tiles at higher levels; (iii) using a database with spatial indexing capabilities.

System Description

Figure 13:
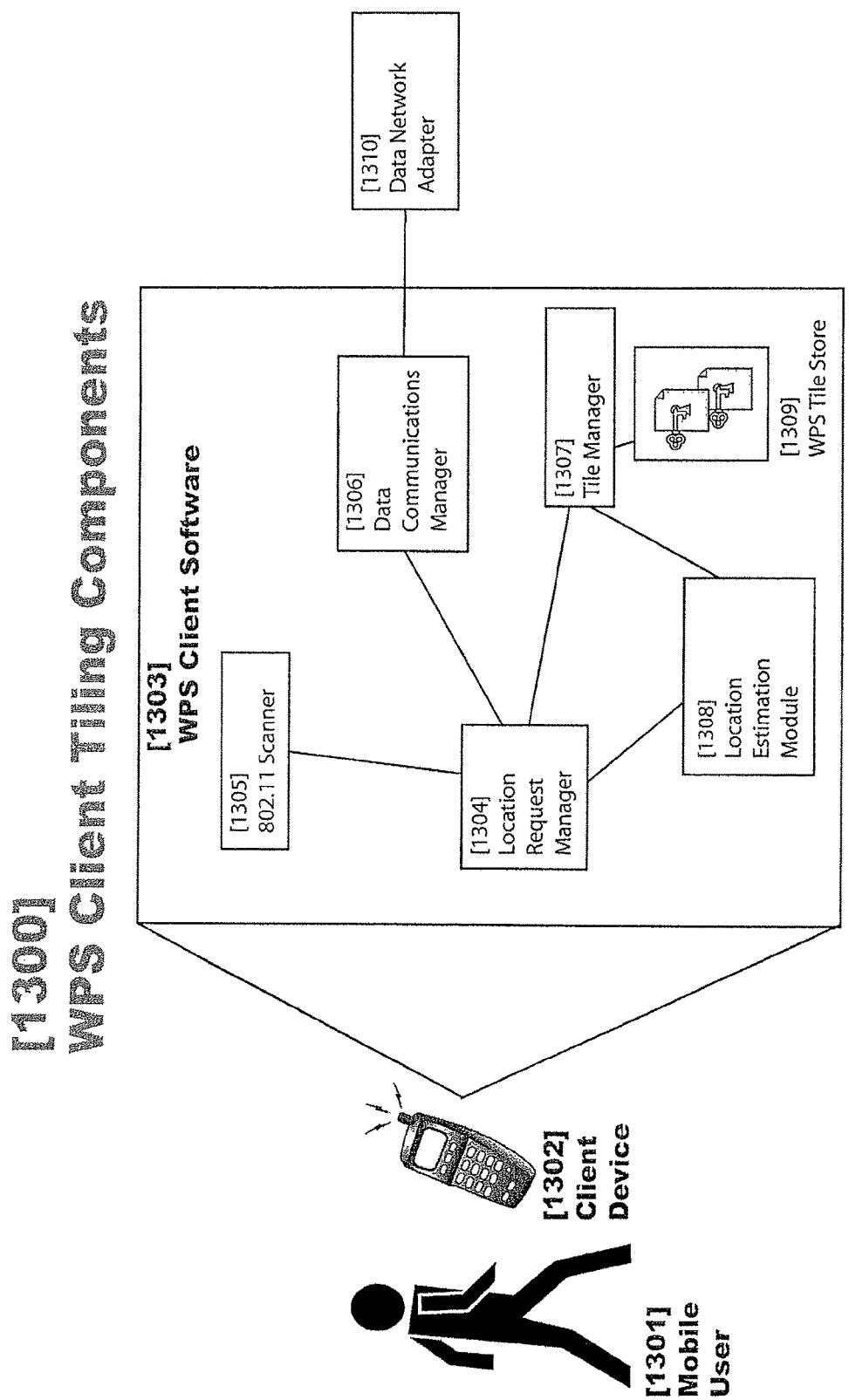
FIG. 13 depicts the client component of a Wi-Fi positioning system, according to certain embodiments of the invention.

FIG. 13 illustrates the various components of one embodiment of the WPS Client software [1303] in more detail. The Location Request Manager (LRM) [1304] receives location requests from applications running on the client device. The LRM manages the tasks necessary to resolve the request, including initiating scans using the Scanner Module [1305], controlling the Data Communications Manager (DCM) [1306], and initiating location estimation using the Location Estimation Module (LEM) [1308]. The LRM is also responsible for coordinating the storage of cached Wi-Fi access point data using the Tile Manager [1307].

The 802.11 Scanner Module resides on the client device and manages the process of gathering information about the radio environment in which the client device operates. The scanner begins this process by directing the 802.11 network adapter to scan for all access points within range of the device. Access points that are within range respond to the scan by providing a unique identifier called a MAC address, according to the 802.11 protocol. Alliteratively, the scanner can also operate in passive mode, relying on the default broadcast signal that is communicated by access points within range. The scanner records the identifier provided by each access point along with the strength of the signal received. The scanner then passes this information to the LEM, which compares the MAC address of each observed access point against the MAC addresses of the access points stored in the Tile Store [209]. The Tile Store returns the location data for each of the observed access points that are known to the system, which is then used by the Location Estimation Module (LEM) [208] to estimate the location of the mobile device.

The LEM is responsible for estimating the location of the client device based on the Wi-Fi access point information contained in the Tile Store. The required input consists of a set of Wi-Fi access points identified by their MAC address and their respective received signal strength information. Additional inputs may include previous location(s) of the client device, direction, velocity and other relevant data that may be available. Using this data, the LEM may estimate the location of the client device using any combination of the location algorithms presented earlier and incorporated herein by reference (see "Related Methods and Techniques," supra).

The Data Communication Manager (DCM) [1306] is initiated by the Location Request Manager [1304] when there is insufficient local information necessary to resolve the location of the client device or when the local information is outdated. The DCM initiates communication with the Central Server using the Data Network Adapter [1310], providing to the server client attributes (e.g. client resource constraints), in addition to information gathered by the Scanner module. The Central Server will provide an initial location as well as a prioritized set of TileIDs corresponding to tiles which the server has determined to be appropriate for client-side location resolution. The DCM continues to communicate with the Central Server to retrieve the tiles in priority order as desired.

The Tile Manager [1307] is responsible for organizing, adding, removing, and accessing WPS Tiles that are kept in the Tile Store [1309]. The Tile Manager can determine if the local set of WPS Tiles are insufficient to resolve a location request and notifies the Location Request Manager that more tiles are required. The Tile Manager is also responsible for managing the resource utilization of the Client Device by removing outdated information as well as data that are not likely to be required in the near future for subsequent Location Requests. The Tile Manager can proactively request Tiles that may be necessary in future location requests based on gathered information such as the velocity and direction of the client travel, or based on information that is provided by the client application that initiated the Location Request.

One embodiment of the invention provides a method for incremental resolution of WPS Tiles. This process provides an initial set of access point location information that provides a lower accuracy location estimation, but accuracy improves as subsequent resolution levels are received from the server. This process can be used to provide high resolution near the projected location of the device, with lower resolution towards the extremities, thus reducing the amount of network transfer that is required to achieve initial location estimations with little loss in generality of the overall solution. Incremental resolution can be used within a single tile or amongst a set of tiles, e.g. the primary tile is retrieved at full resolution while secondary tiles are initially retrieved at a lower resolution.

In order to conserve memory on the client device, the Tile Manager may also remove tiles from the Tile Store that are no longer needed. A number of factors may be used in determining when a tile is no longer needed. In one embodiment, the Tile Manager uses a Least Recently Used algorithm to remove cached tiles that have remained unused for the longest time period. Other caching algorithms may be used to enhance and optimize the storage for particular applications. Additionally, tiles that are used frequently, such as the tile that contains the device owner's home address, may be "pinned" in the cache, indicating to the Tile Manager that they should not be removed. The speed and direction of the client device may also be used in determining when a tile is no longer needed. Also, geographic features such as roads may be used to predict which tiles will probably not be needed in the near future. In certain embodiments, the history of movement of a client device is recorded and this information is used to determine the likelihood that a given tile will be needed in the future.

The Data Network Adapter (DNA) [1310] provides a method for transmitting and receiving data between the client device and the Central Network Server. The DNA is generally a wireless network adapter but could under certain embodiments be a wired network adapter instead. The 802.11 network adapter used for scanning may double as the data network adapter in certain embodiments. The DCM determines the appropriate communications mechanism and manages the connection and data transfer between the client and the server.

Figure 14:
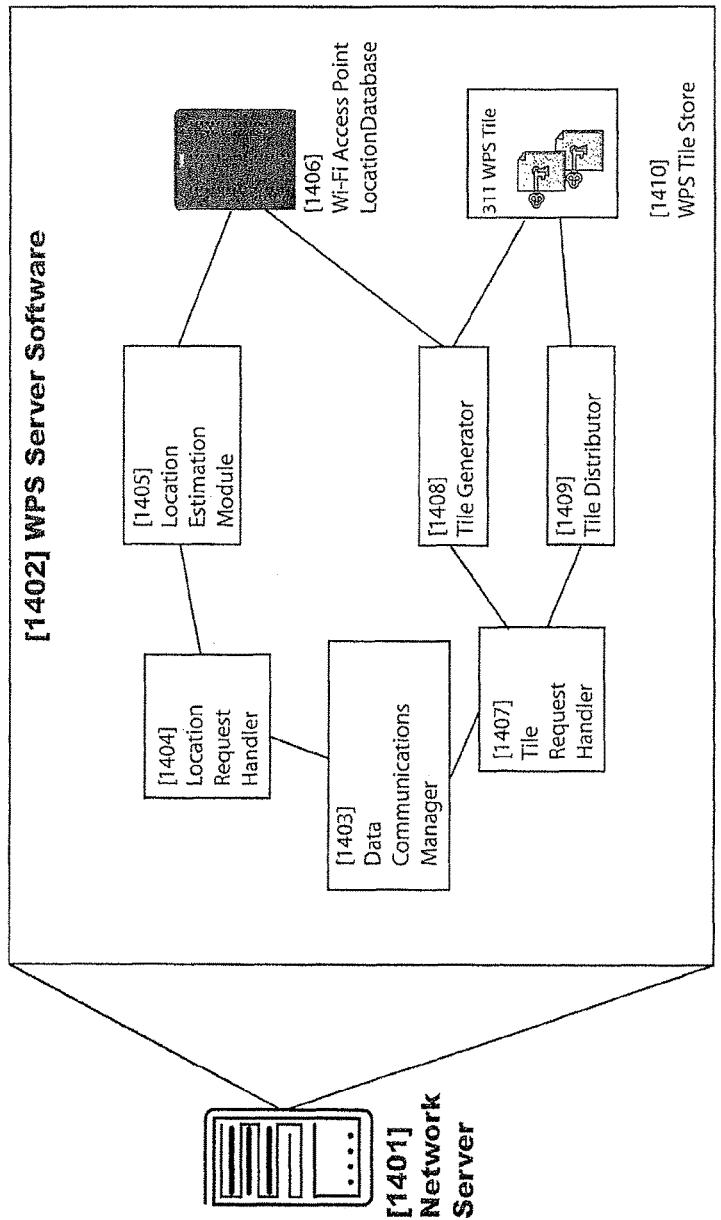
FIG. 14 depicts the server component of a Wi-Fi positioning system, according to certain embodiments of the invention.

FIG. 14 illustrates the various components of the WPS Network Server [1401] in more detail. The Network Server maintains the Master Wi-Fi Access Point Location Database [1406]. It is responsible for server-side location resolution as well as WPS Tile creation and distribution. The Network Server is the central managing component of the entire WPS system, coordinating the activities of the various client devices while maintaining the central radio beacon location database, optimizing data for distribution, and refreshing the database with new information related to the 802.11 access points.

The Wi-Fi location database [1406] resides on the Central Server and consists of geolocation information (e.g. latitude and longitude), confidence factors related to the accuracy of the location estimates of each of the known Wi-Fi access points, timestamps representing the time at which the various data were gathered, and TileID information used to uniquely identify each tile (as described in more detail below and illustrated in FIG. 20).

The Location Request Handler [1404] accepts requests from client devices for location resolution. This component will respond with location and/or WPS Tile information necessary to resolve the location request. While the Location Request Handler responds to requests for tile locations, the Tile Request Handler [1407] accepts requests from client devices for specific WPS Tiles. This component will respond with the requested WPS Tile if available. If a client requests a tile that is no longer valid, the server will respond with appropriate error information including the WPS Tile or Tiles that have replaced the requested WPS Tile.

The WPS Tile Generator [1408] is responsible for determining the proper polygonal size of each tile within the coverage area for the WPS system. The system calculates the density of the access points and subdivides the world on a geographic (latitude and longitudinal) basis, optimizing the polygons for storage size and Wi-Fi access point density.

Communication of WPS Tiles to the client is handled by the WPS Tile Distributor [1409]. After authenticating the request, the Distributor packages a given WPS Tile for distribution to the requesting WPS Client.

The Data Communications Manager (DCM) [1403] on the Network Server communicates with the DCM on the client WPS device. The two modules manage the authentication process and monitor the connection to ensure that data is transferred correctly over the network, validated and persisted on the local device.

Creating Tiles

Figure 19:
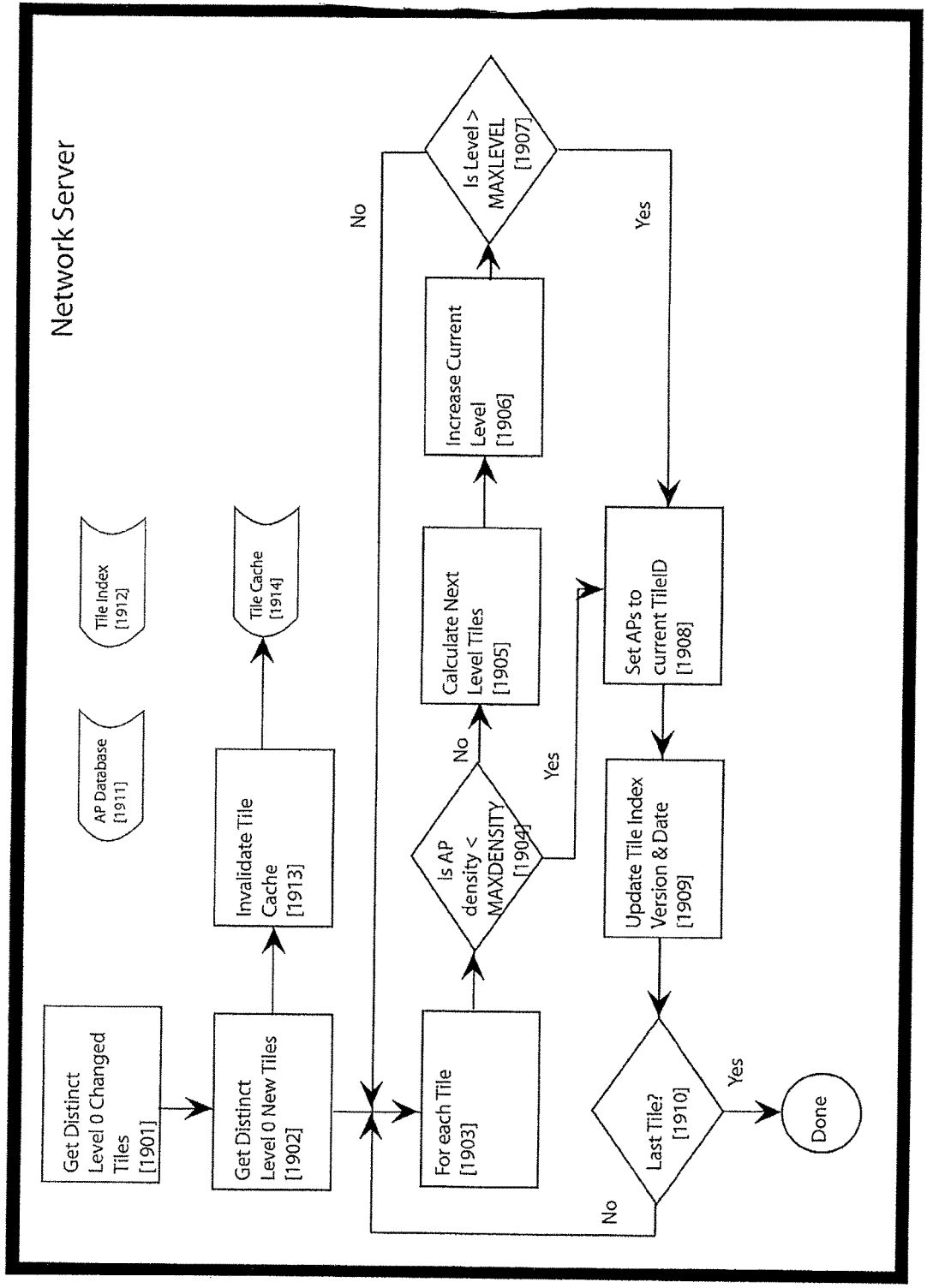
FIG. 19 depicts the method by which the server component of a Wi-Fi positioning system uses the density of Wi-Fi access points to determine an appropriate tile size, according to certain embodiments of the invention.

FIG. 19 depicts the process by which appropriate tile sizes are generated and access points are assigned to a designated tile. The Network Server periodically determines which Tiles need adjusting [1901]. This is accomplished by identifying access points that have been added to the tile or removed from the tile, as well as those access points that have been moved within the tile. Identifying the Level 0 tile for each of these access points is simply a matter of truncating the latitude and longitude values for each access point and determining the distinct set of Level 0 tiles that result. For optimization, and to enable efficient determination of these tiles, the current implementation will modify an access point's TileID by setting it to null whenever an action is performed on that access point (e.g. the position of the AP is modified). This same process can be used to identify new Tiles [802] that now need to be created due to the movement or the addition of access points.

For each TileID as identified above, the algorithm recursively subdivides each tile until each tile has reached the desired density (e.g. number of access points within the bounds of the tile's geographic region) or until it has reached the maximum level of granularity (in the particular implementation that is described herein, tiles at level 4 represent the smallest tiles that are practically employed). For each of these optimal tiles, the access points within the MBR are assigned to the corresponding TileID.

In general, the desired average density of access points per tile is optimized to maximize efficiency and speed according to a specific embodiment. One preferred embodiment uses the density limit of 8000 access points per tile, which ensures encoded file size of around 50 KB per tile. If a level-N tile contains more than 8000 access points, the entire region is subdivided into tiles of level N+1. The minimum viable density is 1 AP per tile—level-0 tiles that contain no access points are simply ignored.

Some embodiments may use additional factors to determine the size of the WPS Tiles. For example, the tile size may be chosen according to the client device's movement history, its memory capacity, or the available network bandwidth.

Interaction Timeline

Figure 15:
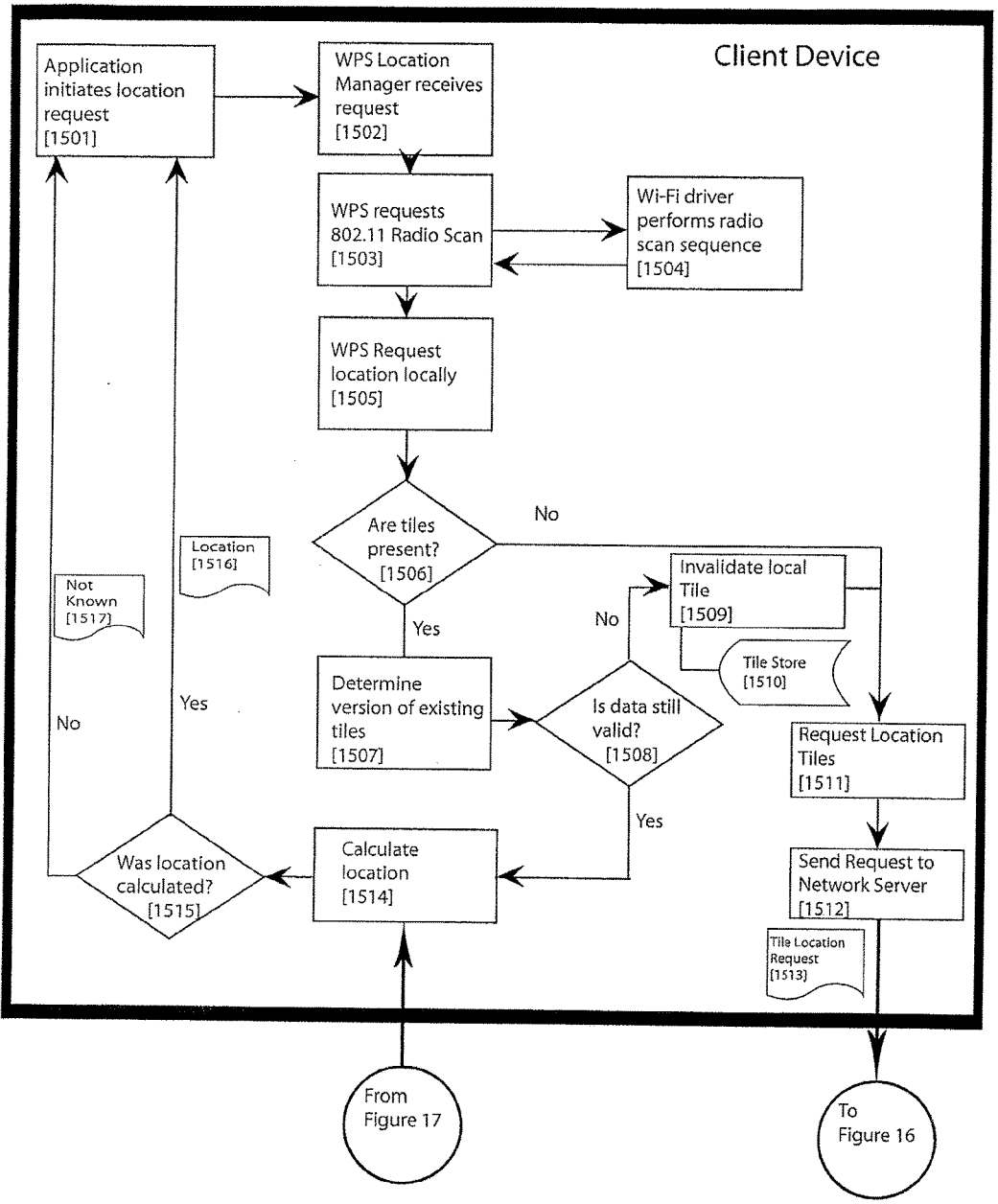
FIG. 15 depicts the operation of the client component of a Wi-Fi positioning system in response to a location request from a client application, according to certain embodiments of the invention.
Figure 16:
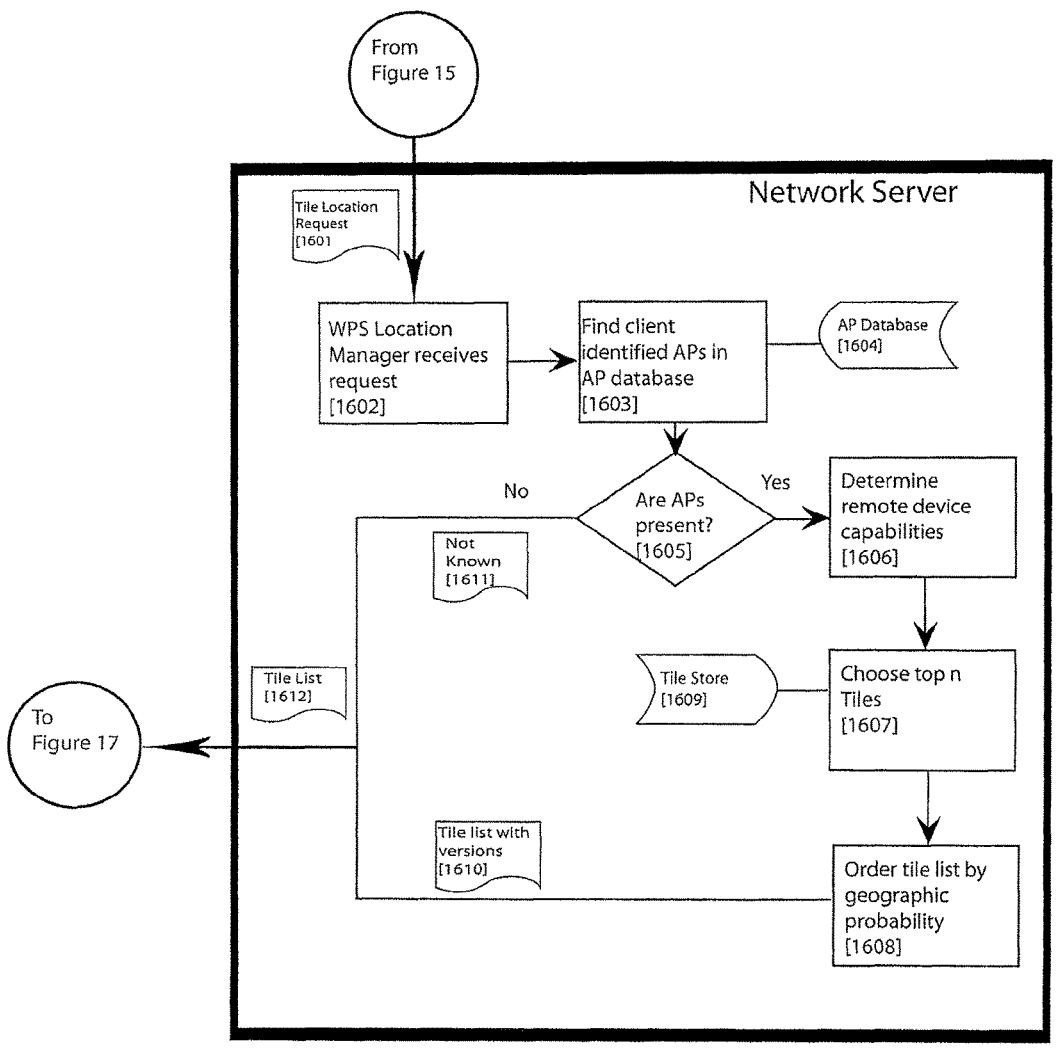
FIG. 16 depicts the operation of the server component of a Wi-Fi positioning system in response to a location request from the client component, according to certain embodiments of the invention.
Figure 17:
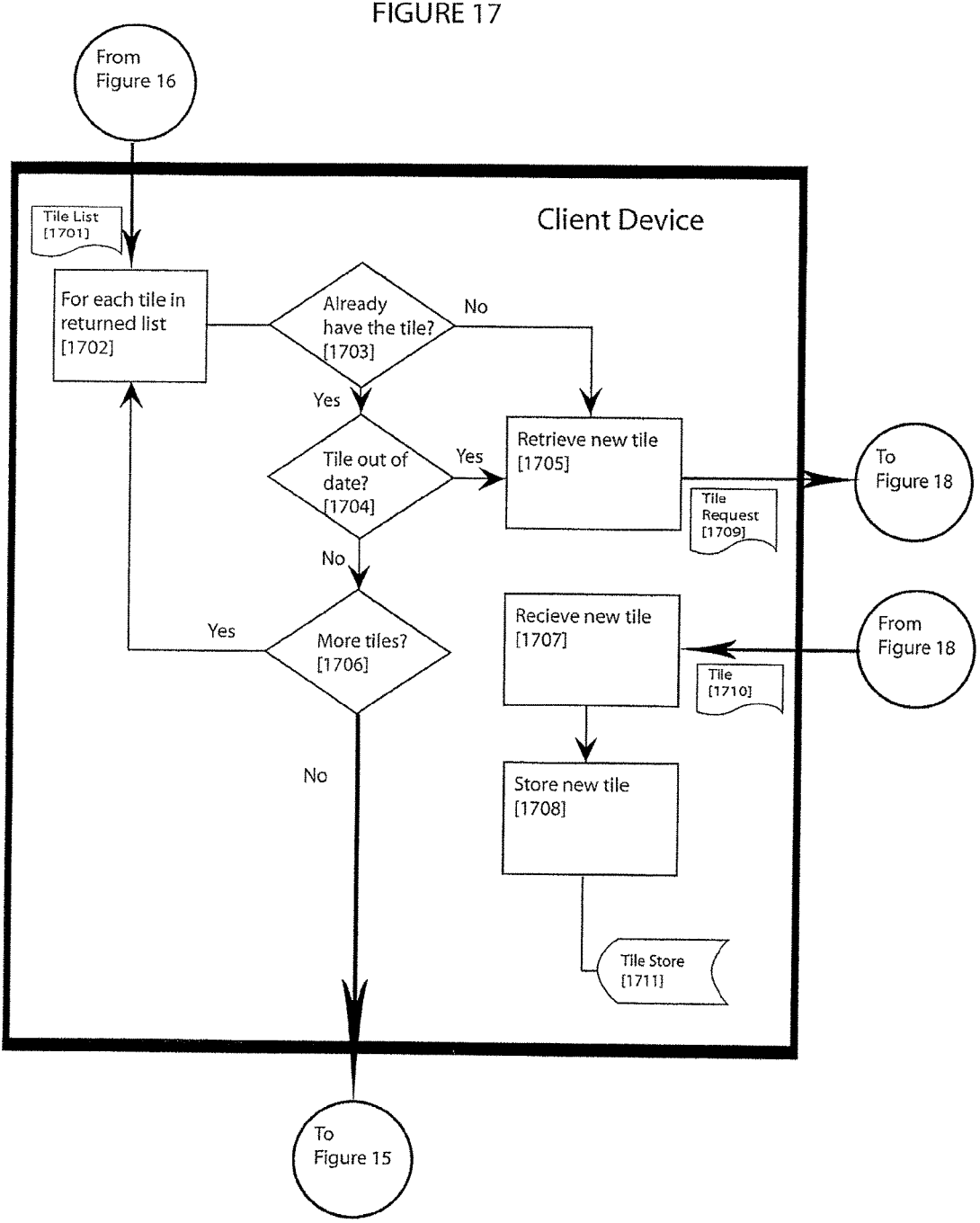
FIG. 17 depicts the operation of the client component of a Wi-Fi positioning system upon receipt of a list of tile identifiers, according to certain embodiments of the invention.
Figure 18:
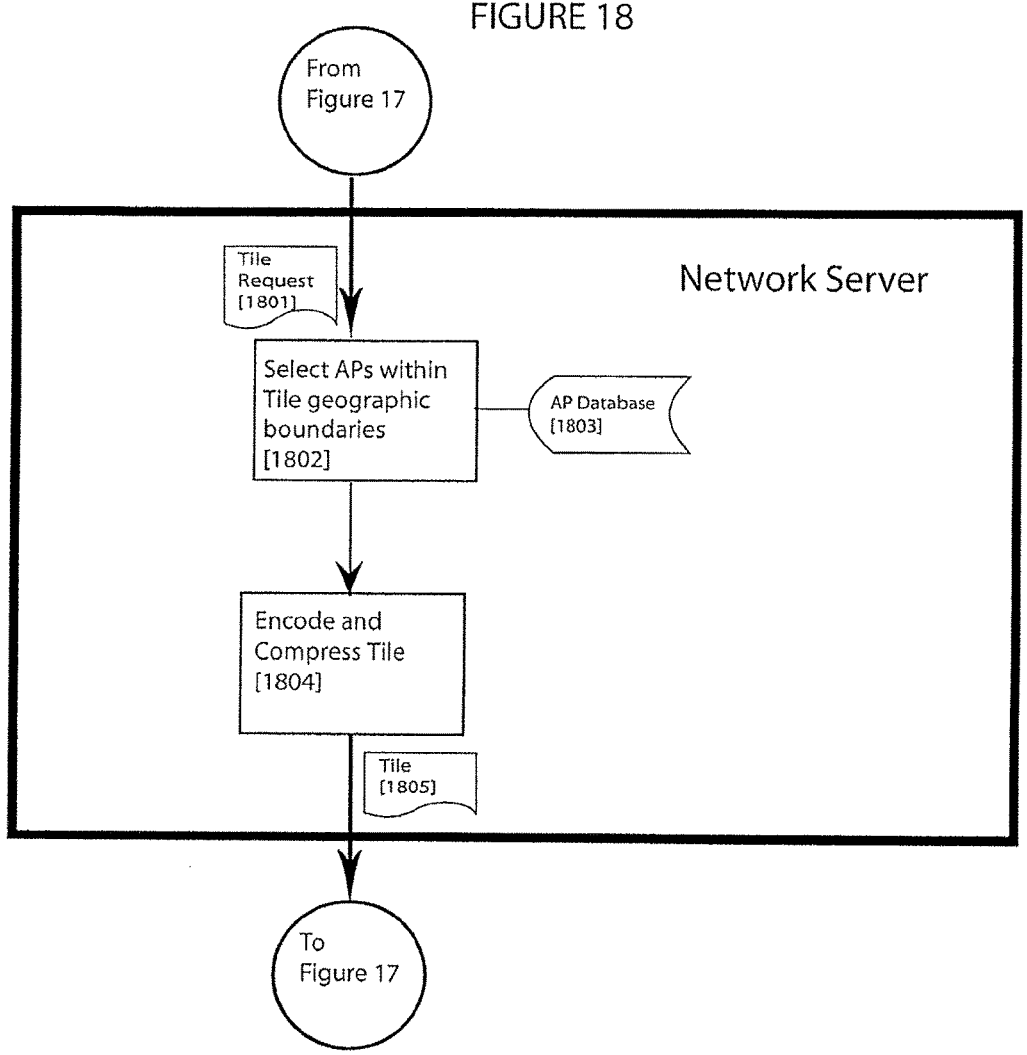
FIG. 18 depicts the operation of the server component of a Wi-Fi positioning system in response to a tile request from the client component, according to certain embodiments of the invention.

FIGS. 15 and 17 depict the operation of the client system. FIGS. 16 and 18 depict the operation of the server system. The following description refers to these diagrams and describes the interaction among the various system components.

First, a software application executing on a mobile device requests location information from the WPS system [1501]. The WPS System's Location Request executes a Client Scan [1503], gathering information about the Wi-Fi access points that can be received by the client device's 802.11 network adapter. The WPS client software first attempts to resolve the location of the device using WPS Tiles previously retrieved [1505][1506]. If the information is not present on the local device, the WPS client software continues. The WPS client software will make a request to the WPS Central Server via the Data Communications Manager and the Data Network Adapter to retrieve its current location and information regarding WPS Tiles that are necessary for subsequent location requests [1511][1512].

The Central Server receives the Tile Location request in the Data Communications Manager and hands the request to the Location Request Handler, which: (i) determines the location of the client [1603] using the list of access points that the client software has sent; (ii) determines the WPS Tile(s) necessary to resolve this and future location requests [1607]; and (iii) responds with the current location and a list of WPS Tiles and the timestamp of the most recent update to each WPS Tile through the Location Request Handler and the Data Communications Manager. Each tile in this list is assigned a priority estimate based on the likelihood that the client will need this tile to locate itself autonomously in the near future [1608].

More specifically, the tile that contains the estimated location of the WPS client device is assigned the highest priority, and the surrounding tiles are then assigned priority based on the probability that the client device will be in or near that tile in the future. The surrounding tiles are found by modifying the TileID of the central tile according to the TileID scheme presented above.

Also, the list of recommended TileIDs sent to the client may include more than just the tile in which the client device is located and the immediately surrounding tiles. The WPS software may make use of additional information, such as the velocity and bearing of the user device to preemptively request additional tile information. Additionally, the WPS software may make use of geographic attributes such as roads to more accurately predict the future position of the client device. The ability to proactively predict future locations increases the amount of time during which the client device will be able to function autonomously, and thereby reduces load on the network server and the communications network itself. The limitations of the client device, including memory capacity, battery life, and network speed and cost, may also be used to determine the list of TileIDs that are recommended by the server.

Each TileID in the list is associated with a priority, which may be determined according to a number of factors, including the location history of the client device, geographical features such as roads, the network bandwidth that is available, and the speed and direction of the user device. For example, if the client were traveling on a road that would not allow the client to travel to tile X before traveling to tile Y, tile Y may be assigned a higher priority than tile X.

The client WPS software examines the list of TileIDs provided by the server to determine which of the corresponding tiles are needed. This determination may also make use of information such as the velocity and bearing of the client, roads and other geographic attributes, and the physical limitations of the client device itself.

When the client has selected a set of TileIDs, it formats a request [1709] to the WPS Server for each of these tiles. The WPS Central Server authenticates each WPS Tile Request [1801] and generates the requested WPS Tile [1805] if necessary. The process of authentication ensures that unauthorized client devices cannot download tiles from the central server. For example, one embodiment of the tile fetching system operates over the HTTP protocol, and standard HTTP authentication schemes may be used to ensure that all client requests are transmitted by properly authorized clients.

The requested WPS Tile is then packaged [1804] and returned to the WPS Client. The WPS Tile Manager on the client device ensures that the new WPS Tile will fit within the available resources (e.g. memory or data storage) and removes old or non-essential WPS Tiles as necessary.

Example Intended Use

The following illustrates an example projected use of certain embodiments of the invention. In this example scenario, the user of a mobile device equipped with WPS software lives in a suburb of a city but works downtown. In the morning, the user asks the device (via a User Application such as navigation software) to determine the current location. This action triggers the WPS software to activate.

In this scenario, the User Application requests the location from the WPS Location Provider. The WPS Location Request Manager makes a request to the Client Device Location Estimation Module. If the LEM is unable to provide a location autonomously, the Location Request Manager passes control to the Data Communication Manager to request and retrieve location and WPS Tiles as necessary from the Central Server. The results of a Wi-Fi scan are passed to the server and the server responds with a list of recommended TileIDs that are prioritized according to the factors listed above. The client then sends a Tile Request for each of the TileIDs desired, and upon receiving a sufficient number of tiles from the Server, the Location Request Manager once again requests a location from the Location Estimation Module. This time, the necessary information is present on the local device, and the location of the client device is thereby determined.

As the person travels into the city, the device will move towards the boundary of the WPS Tiles that are stored on the client device. The WPS Client Software is able to calculate the boundaries of the cached region from the TileIDs of the cached tiles. When the estimated location of the client device is within a threshold distance of the cache boundaries, the Tile Manager will inform the Location Request Manager that additional tiles are required. This initiates another series of communications between the client Data Communication Module and the Central Server to retrieve additional tiles. This process repeats as needed based on the movements of the person and the constraints of the client device (such as storage and network capacity).

The threshold distance used to trigger the pre-fetching of additional tiles may depend on a variety of factors, including, e.g., the size of the relevant tiles, the memory capacity of the client device, and the estimated velocity of the user device. For example, if the client device is moving quickly toward a boundary, it is logical to request additional tiles sooner, to ensure that the user does not cross the boundary before the necessary tiles have been downloaded. When the client device is stationary, the need for additional tiles is less urgent, and the threshold distance might be correspondingly lower.

The client device may also proactively request tiles that may not be of immediate use. This act of pre-fetching can depend on a number of factors such as the size of current tiles, the memory capacity of the client device, the estimated velocity of the user device, and the bandwidth of the network connection to the server. For example, a large number of tiles may be pre-fetched when a high-capacity network is present, to reduce the cost and improve the execution speed when the device must connect to the server over a more limited network. Additional factors may also be used for pre-fetching, including geographical features like roads, the history of movement of the client device, the required accuracy of the user application, and physical constraints such as bridges and mode of transportation.

It will be appreciated that the scope of the present invention is not limited to the above described embodiments, but rather is defined by the appended claims; and that these claims will encompass modifications of and improvements to what has been described.

What is claimed is:

1. A method of caching Wi-Fi access point data on a mobile client device, comprising:
   identifying one or more Wi-Fi access points in range of the mobile client device based on signals received by a Wi-Fi radio of the mobile client device;
   estimating a location of a mobile client device utilizing the identified one or more Wi-Fi access points and Wi-Fi access point data of one or more Wi-Fi positioning system (WPS) tiles in a WPS tile store on the mobile client device;
   based on the estimated location, determining the mobile client device is within a threshold distance of a boundary of the one or more WPS tiles present in the WPS tile store on the mobile client device;
   requesting, by WPS client software executing on the mobile client device, one or more new WPS tiles from a reference database of a remote server;
   receiving the one or more new WPS tiles from the remote server;
   caching, by the WPS client software, the one or more new WPS tiles in the WPS tile store on the mobile client device;
   estimating one or more further locations of the mobile client device based on one or more new Wi-Fi access points now in range of the mobile client device and Wi-Fi access point data of the one or more new WPS cached tiles now in the WPS tile store on the mobile client device; and utilizing at least the estimated location or the one or more further estimated locations by a location-based application to provide a service to a user of the mobile client device.

2. The method of claim 1, wherein the threshold distance is based on a size of the one or more WPS tiles.

3. The method of claim 1, wherein the threshold distance is based on a memory capacity of the mobile client device.

4. The method of claim 1, further comprising
estimating a velocity of the mobile client device based on the signals received from the one or more Wi-Fi access points in range of the mobile client device,
wherein the threshold distance is based on the estimated velocity of the mobile client device.

5. The method of claim 1, wherein the estimating is performed on the mobile device autonomously from the remote server.

6. The method of claim 1, wherein the estimating is performed by providing a list of the one or more identified Wi-Fi access points to the remote server and receiving back the estimated location from the remote server.

7. The method of claim 1, further comprising:
receiving a list of WPS tiles from the remote server; and
selecting the one or more new WPS tiles from the list of WPS tiles.

8. The method of claim 7, wherein the selecting is based on priority estimates that indicate likelihood that the mobile client device will need each WPS tile.

9. A non-transitory device readable medium having instruction stored thereon, the instructions when executed on a mobile client device being operable to:
identify one or more Wi-Fi access points in range of the mobile client device based on signals received by a Wi-Fi radio of the mobile client device;
estimate a location of a mobile client device utilizing the identified one or more Wi-Fi access points and Wi-Fi access point data of one or more Wi-Fi positioning system (WPS) tiles in a WPS tile store on the mobile client device;
based on the estimated location, determine the mobile client device is within a threshold distance of a boundary of the one or more WPS tiles present in the WPS tile store on the mobile client device;
receive the one or more new WPS tiles from a remote server;
cache the one or more new WPS tiles in the WPS tile store on the mobile client device;
estimate one or more further locations of the mobile client device based on one or more new Wi-Fi access points now in range of the mobile client device and Wi-Fi access point data of the one or more new WPS cached tiles now in the WPS tile store on the mobile client device; and
provide the at least the estimated location or the one or more further estimated locations to a location-based application that provides a service to a user of the mobile client device.

10. The non-transitory device readable medium of claim 9, wherein the threshold distance is based on a size of the one or more WPS tiles.

11. The non-transitory device readable medium of claim 9, wherein the threshold distance is based on a memory capacity of the mobile client device.

12. The non-transitory device readable medium of claim 9, wherein the instructions when executed are further operable to:
estimate a velocity of the mobile client device based on the signals received from the one or more Wi-Fi access points in range of the mobile client device,
wherein the threshold distance is based on the estimated velocity of the mobile client device.

13. A mobile client device comprising:
a Wi-Fi radio; and
a memory storing Wi-Fi positioning system (WPS) client software that includes
a scanner module configured to use the Wi-Fi radio to detect Wi-Fi access points within range of the mobile client device,
a location estimation module configured to use Wi-Fi access point data of tiles cached in a WPS tile store to estimate a location of the mobile client device,
a tile manager module configured to maintain WPS tiles that include Wi-Fi access point data used to estimate location of the mobile client device, and to, based on the estimated location of the mobile client device, determine the mobile client device is within a threshold distance of a boundary of the one or more WPS tiles present in the WPS tile store, and
a data communications manager module configured to request one or more new WPS tiles from a remote server for updating the WPS tile store when the mobile client device is within the threshold distance of the boundary of the one or more WPS tiles present in the WPS tile store.

14. The mobile client device of claim 13, wherein the WPS client software further includes a location request manager module configured to process a location requests from a location-based application executing on the mobile device and return to the location-based application at least one of the estimated location of the mobile client device or one or more further estimated locations of the mobile client device that are estimated by the location estimation module at least in part using Wi-Fi access point data from the one ore more new WPS tiles.

15. The mobile client device of claim 13, wherein the threshold distance is based on a size of the one or more WPS tiles.

16. The mobile client device of claim 13, wherein the threshold distance is based on a memory capacity of the mobile client device.

17. The mobile client device of claim 13, wherein the location estimation module is configured to perform the estimation of the location of the mobile client device autonomously from the remote server.

18. The mobile client device of claim 13, wherein the location estimation module is configured to perform the estimation of the location of the mobile client device by providing a list of the one or more identified Wi-Fi access points to the remote server and receiving back the estimated location from the remote server.

19. The mobile client device of claim 13, wherein the one or more new WPS tiles are selected from a list of WPS tiles based on priority estimates that indicate likelihood that the mobile client device will need each WPS tile.

* * * * *